(12) United States Patent
Hata et al.

(10) Patent No.: US 6,902,790 B1
(45) Date of Patent: Jun. 7, 2005

(54) CERAMIC SHEET AND PROCESS FOR PRODUCING THE SAME

(75) Inventors: Kazuo Hata, Himeji (JP); Norikazu Aikawa, Himeji (JP); Keijirou Takasaki, Himeji (JP); Masatoshi Shimomura, Himeji (JP); Koji Nishikawa, Taishi-cho (JP)

(73) Assignee: Nippon Shokubai Co., Ltd., Osaka (JP)

( * ) Notice: Subject to any disclaimer, the term of this patent is extended or adjusted under 35 U.S.C. 154(b) by 0 days.

(21) Appl. No.: 09/597,763

(22) Filed: Jun. 20, 2000

(30) Foreign Application Priority Data

Jun. 24, 1999  (JP) ............................................ 11-178897
Sep. 28, 1999  (JP) ............................................ 11-274254
Dec. 7, 1999   (JP) ............................................ 11-348072

(51) Int. Cl.$^7$ ............................. B32B 1/04; B32B 18/00
(52) U.S. Cl. ....................... 428/141; 428/325; 428/332; 428/220; 428/704; 429/30; 264/678; 264/673; 501/103; 501/104
(58) Field of Search ................................ 428/141, 325, 428/332, 220, 704; 429/30; 264/678, 673; 501/103, 104

(56) References Cited

U.S. PATENT DOCUMENTS

| | | |
|---|---|---|
| 4,886,768 A | 12/1989 | Tien ........................... 501/104 |
| 5,733,499 A * | 3/1998 | Takeuchi et al. ............ 264/165 |

FOREIGN PATENT DOCUMENTS

| | | |
|---|---|---|
| EP | 0 334 279 | 9/1989 |
| EP | 0 704 413 | 4/1996 |
| JP | 2-177265 | 7/1990 |
| JP | 6-64969 | 3/1994 |
| JP | 7-52099 | 2/1995 |
| JP | 8-151270 | 6/1996 |
| JP | 8-151271 | 6/1996 |
| JP | 10-217181 | 8/1998 |

* cited by examiner

Primary Examiner—William P. Watkins, III
(74) Attorney, Agent, or Firm—Wenderoth, Lind & Ponack, L.L.P.

(57) ABSTRACT

A ceramic sheet has a burr height on the periphery of the sheet of ±100 μm or less and/or a dimple height on the sheet surface of 100 μm or less, as determined by irradiating the sheet with a laser beam to measure reflected light, and three-dimensionally analyzing the reflected light with a laser optical three-dimensional profiling instrument. This sheet is highly resistant to stacking-induced loads and thermal stresses. Further, when the ceramic sheet includes a zirconia ceramic partially stabilized with 2.8 to 4.5% by mole of yttria and containing 0.1 to 2% by mass of at least one dispersed reinforcing oxide, in which the grain size of the surface of the sheet has an average of 0.1 to 0.4 μm, a maximum of 0.4 to 0.8 μm, and a coefficient of variation of 30% or less, which grain size is determined by scanning electron microscopic observation, the ceramic sheet has satisfactory strength at room temperature and at high temperatures and satisfactory durability of strength at high temperatures. The ceramic sheet is very useful as, for example, a solid-electrolyte film of a solid oxide fuel cell.

7 Claims, 3 Drawing Sheets

$\theta = \theta_1 + \theta_2$

CERAMIC SHEET AND PROCESS FOR PRODUCING THE SAME

BACKGROUND OF THE INVENTION

1. Field of the Invention

This invention relates to a ceramic sheet and a process for producing the ceramic sheet, particularly, to a ceramic sheet which is resistant to cracking and breakage and has satisfactorily flat surfaces and highly stable qualities in the use as a material for planar solid oxide fuel cell (hereinafter referred to as "SOFC") such as solid-electrolyte film, and so on.

2. Description of the Related Art

Planar SOFC have a basic configuration of a cell stack in which a number of cells are vertically stacked, each cell includes a solid-electrolyte film, an anode arranged on one side of the solid-electrolyte film, and a cathode arranged on the other side of the solid-electrolyte film. In such a cell stack, the individual cells are placed adjacent to one another, and separators (interconnectors) are interposed between the individual cells to avoid a fuel gas and air from mixing with each other. The periphery of the cell including the solid-electrolyte film is sealed and fixed with the separator. When the cell has a manifold inside thereof, at the periphery of the manifold, the cell is also sealed and fixed with the separator.

The separator is generally composed of a heat-resisting alloy or a ceramic having a high specific gravity, and is a thick sheet and therefore has a considerable weight. On the other hand, ceramic sheets for use as constitutive materials of the SOFC such a solid-electrolyte film should be lightweight and thin compared to the separator. The SOFC generally operates at high temperatures of about 800° C. to 1000° C., and the constitutive materials of the SOFC undergo significantly large thermal stresses in addition to heavy loads induced by stacking.

Zirconia sheets and other ceramic sheets are hard and are weak to external forces in a bending direction. If such ceramic sheets for use as solid-electrolyte films and other constitutive materials of SOFC have unevenness (protrusions and depressions), warp, waviness or other irregularities, the stacking-induced load and thermal stress concentrate at the irregularities to invite cracking and breakage to thereby rapidly deteriorate the performance of electric power generation.

The present inventors made intensive investigations to reduce cracking and breakage caused by the stacking-induced load and thermal stress in ceramic sheets for use as solid-electrolyte films of SOFC or the like, and to improve the performances and to prolong the life as SOFC. As part of these investigations, the present inventors found that the cracking and breakage can be minimized by controlling the warp and maximum waviness heights of sheets under specific levels, and proposed improved ceramic sheets (Japanese Unexamined Patent Application Publications No. 8-151270 and No. 8-151271).

The ceramic sheets disclosed in the above publications are capable of resisting the stacking-induced load and thermal stress even if they are significantly large-sized. The use of these ceramic sheets can largely increase the electrically generating capacity as SOFC and are expected to be a very effective technology for commercially practical use of SOFC.

However, the present inventors found the following facts during further investigations. Specifically, even in the a ceramic sheets having minimized warp and waviness disclosed in the above publications, cracking and breakage may occur according to the degree of the stacking-induced load or thermal stress. They also found that dimples on the surface of a ceramic sheet or burrs formed on the periphery of the sheet during punching a ceramic green sheet into a final shape largely affect the cracking and breakage.

When a ceramic sheet is used as the solid-electrolyte film or the like, about 50 to 100 plies or more of the ceramic sheets are stacked and assembled into a SOFC. Particularly in this case, when a large dimple or waviness exists on the surface of the sheet, a localized internal stress occurs in the dimple or waviness when plies of the ceramic sheets are stacked and assembled. If a stacking-induced load or thermal stress is applied during operation of the resulting SOFC, cracking and breakage are liable to occur in the region where the large dimple or waviness exists.

When a ceramic sheet is used as, for example, a solid-electrolyte film of a SOFC, the periphery of the sheet is sealed and fixed with a separator and is firmly restrained. If a large burr exists on the periphery of the sheet, a localized internal stress occurs at this point when the sheet is sealed and fixed, and cracking and breakage occur at the point when a stacking-induced load or stress is exerted on the sheet during operation of the SOFC.

Such a ceramic sheet is generally prepared by a process including the steps of preparing a slurry containing a ceramic material powder, an organic binder, and a dispersion medium, molding the slurry into a sheet by, for example, the doctor blade process, calendering process, or extrusion process, drying the molded sheet to remove the dispersion medium through volatilization to thereby yield a green sheet, punching the green sheet into a predetermined shape, and baking the punched green sheet to decompose and remove the organic binder and to sintered body the powdered ceramic with each other. In the sintering step, the green sheet shrinks to about 70% to 90% in length and to about 50% to 80% in area. Unevenness of the decomposition and emission speed of the organic binder within the green sheet surface during the sintering step or non-uniform of the shrinkage accompanied with sintering in the green sheet surface will cause a large dimple on the surface of the resulting ceramic sheet. If a burr forms on the periphery of the green sheet in the step of punching the green sheet into a predetermined shape, the burr is supposed to substantially remain in the resulting ceramic sheet and may invite defects of product.

Zirconia ceramic sheets are known as representative examples of ceramic sheets having satisfactory performances as solid-electrolyte films of SOFC. Among them, a zirconia ceramic partially stabilized with 2.8 to 4.5 mole percent of yttria is a ceramic obtained by stabilizing tetragonal crystals at room temperature, which tetragonal crystals are originally stable at high temperatures. This partially stabilized zirconia ceramic is supposed to have very high mechanical strength and toughness at room temperature when compared with a fully stabilized cubic zirconia containing 6 to 12% by mole of yttria. The reasons are supposed as follows.

When such a partially stabilized tetragonal zirconia ceramic is subjected to a stress and a fine crack locally occurs, the phase of a tetragonal crystal in the stress field at the edge of the crack is transferred from tetragonal to monoclinic by action of the stress, and a volume expansion accompanied with the phase transition absorbs the stress to thereby inhibit the progress of cracking. However, at high temperatures exceeding 800° C., the tetragonal crystal is stabilized and the ease of the phase transition from tetragonal to monoclinic is decreased, and the toughness of the ceramic is supposed to markedly decrease to a level similar to that of a fully stabilized cubic zirconia ceramic. When such a zirconia ceramic is used as a molded sheet, the surface on which the stress is applied become significantly large relative to the total volume of the sheet, and the aforementioned phenomena markedly occur.

For example, the bending characteristics of high strength zirconia sintered body are described on page 38 of "New Material Manual 1987 (4th Edition)" (published on Mar. 27, 1987 from Techno Plaza Co., Ltd., Japan), in which the bending strength of the zirconia sintered body is 120 to 170 kgf/mm$^2$ (about 1.2 to 1.7 GPa) at room temperature but is decreased to 30 to 40 kgf/mm$^2$ (about 0.3 to 0.4 GPa) at 1000° C.

On the other hand, ceramics are satisfactory in heat resistance and abrasion resistance and other mechanical characteristics and also in electrical and magnetic characteristics and are therefore employed in a variety of applications. Of these ceramics, ceramic sheets essentially composed of zirconia have a satisfactory oxygen ion conductivity, heat and corrosion resistance, toughness, chemical resistance and are effectively used as solid-electrolyte film(s) for a sensor member such an oxygen sensor or a humidity sensor, as well as solid-electrolyte film(s) for SOFC as stated above.

Attempts have been made in which alumina and other additional components are incorporated into the zirconia ceramic. For example, Japanese Unexamined Patent Application Publication No. 2-177265 proposes a technique of adding 5 to 20% by mass(weight) of alumina to a partially stabilized zirconia and sintering. The zirconia containing alumina in order to avoid the formation of monoclinic crystals even in a long-term use at high temperatures, to inhibit the decrease of conductivity even at high temperatures and to obtain a solid-electrolyte film having satisfactory mechanical strength. This publication states that the addition of alumina in the above-specified proportion to the partially stabilized zirconia inhibits the phase transition from tetragonal to monoclinic even at high temperatures to thereby increase the mechanical strength and stability of the ceramic.

However, even though the mechanical strength of the solid-electrolyte alone can be improved by the addition of alumina, when the solid-electrolyte is assembled with electrodes into a cell, the alumina and electrode components are supposed to undergo a solid-phase reaction at high temperatures to form an alumina complex oxide having a low conductivity. The resulting cell is therefore supposed to be low in mechanical strength.

Japanese Unexamined Patent Application Publication No. 6-64969 discloses a zirconia ceramic containing a decreased amount of alumina. This ceramic is a zirconia solid-electrolyte film containing 2 to 12% by mole of yttria as a solid solution and 0.01 to 2% by mass of alumina. This ceramic is mainly directed to suppress changes with time of electrical conductivity when an electric current is continuously passed but is not directed to improve the strength.

U.S. Pat. No. 4,886,768 discloses a toughened tetragonal zirconia prepared by adding 0.5 to 3% by mole of Ta$_2$O$_5$ or Nb$_2$O$_5$ as a toughening agent to a zirconia stabilized with 2 to 4% by mole of Y$_2$O$_3$. This zirconia does not have sufficiently highly stable mechanical strength over time. This is probably because Ta$_2$O$_5$ or Nb$_2$O$_5$ is added in an excessively large amount.

Attempts to improve strength at high temperatures of partially stabilized zirconia ceramics are still not sufficiently made.

SUMMARY OF THE INVENTION

Under these circumstances the present invention has been made, and an object of the invention is to provide a ceramic sheet as in a constitutive material for use in a planar SOFC and the like which exhibits less cracking or breakage even when a large stacking-induced load or thermal stress is applied, and a process for producing the ceramic sheet.

Thus the present invention provides, in an aspect, a ceramic sheet having a burr height on the periphery of the sheet of ±100 μm or less, and/or having a dimple height on the surface of the sheet of 100 μm or less, in which the burr height and the dimple height are determined by irradiating the sheet with a laser beam to measure reflected light, and three-dimensionally analyzing the reflected light with a laser optical three-dimensional profiling instrument.

The term "burr height" used herein means the difference in heights between the maximum point and the minimum point of the sheet in an area ranging from the peripheral edge of the sheet to 3 mm inside the edge. A plus (+) burr height means a burr formed on the surface side to which a laser beam is applied, and a minus (−) burr height means a burr formed on the opposite side thereof. The term "dimple" used herein means a protrusion or a depression locally formed on the surface of a sheet, and can be clearly distinguished from "waviness" or "warp" which continuously occurs as waves. The shape and causes of these two types of irregularities are different from each other.

In another aspect, the invention provides a process for producing a ceramic sheet comprising a punching step of punching a ceramic green sheet in a direction substantially perpendicular to the sheet surface, and a baking step of baking the punched sheet, wherein a punching blade which satisfies the following mathematical expression is used and said punching blade travels with a face to be punched being pressed by an elastic polymer member in said punching step:

$$20° \leq \theta = \theta_1 + \theta_2 \leq 70° \text{ and } \theta_1 \leq \theta_2$$

wherein θ is an angle of blade, $\theta_1$ is an angle defined by an edge surface of the blade opposing a product sheet and a center line (X) passing a tip end of the blade in parallel to the traveling direction of the blade, and $\theta_2$ is an angle defined by an edge surface of the blade opposing a residual sheet and the center line (X).

In a further aspect, the invention provides a process for producing a ceramic sheet by baking a ceramic green sheet comprising the step of:

(1) interposing the green sheet between porous sheets each having a porosity of 15% to 85% in a state that the periphery of the green sheet does not protrude from the porous sheets, and baking the ceramic green sheet with an effective amount of a powder interposed between the porous sheets and the ceramic green sheet, or (2) placing a porous sheet having a porosity of 15% to 85% onto the green sheet in a state that the periphery of the green sheet does not protrude from the porous sheet, and baking the ceramic green sheet with an effective amount of a powder interposed between the porous sheet and the ceramic green sheet.

DESCRIPTION OF THE PREFERRED EMBODIMENT

Figure 1:
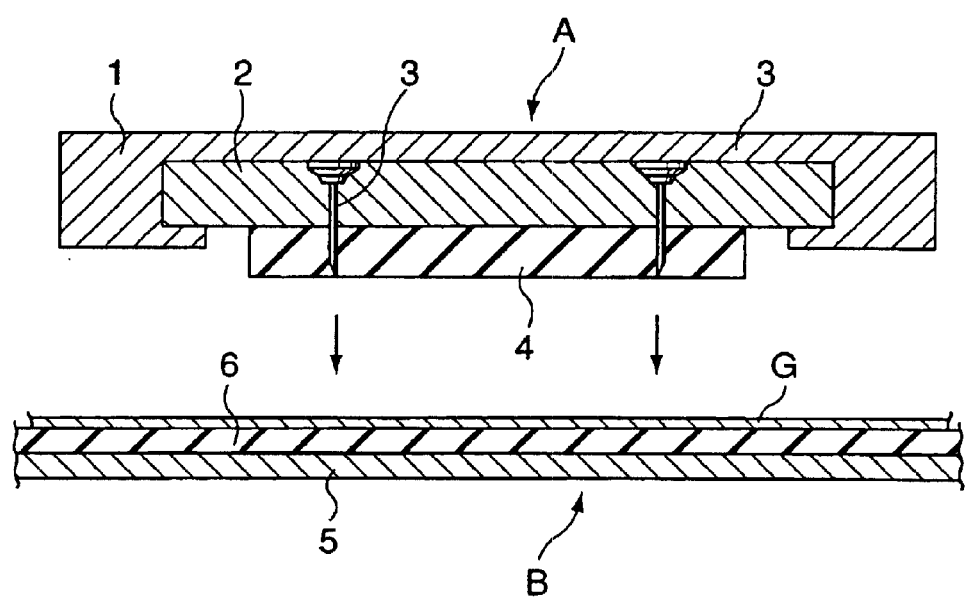
FIGS. 1 to 4 are schematic sectional views each showing the configuration of a punching machine and punching operation as a preferred embodiment of the invention.

To achieve the above objects, the present inventors made various investigations on a ceramic sheet for use as a constitutive material of the planar SOFC in order to reduce cracking and breakage occurred in the use as SOFC to improve the performances of the SOFC and to prolong its life.

As a result, the inventors found that cracking and breakage formation occurred in a peripheral region of the sheet where the sheet is sealed and fixed are largely affected by burr heights on the periphery of the ceramic sheet, and that cracking and breakage occurred on the surface of the sheet are largely affected by dimple heights on the surface of the ceramic sheet. They also verified that the cracking and breakage induced by burrs on the periphery can be minimized by controlling the burr height to ±100 $\mu$m or less, and that cracking and breakage formed on the sheet face can be minimized by controlling the dimple height to 100 $\mu$m or less and preferably controlling the waviness height to 100 $\mu$m or less. The invention has been accomplished based on these findings.

The above range of the burr height is specified according to the Invention for the following reasons. In the use for, for example, the SOFC, the periphery of the ceramic sheet is sealed and fixed, and is therefore firmly constrained. If a burr even of a slight height is formed on the periphery, a stress concentrates the burr portion to cause cracking and breakage. Accordingly, to minimize the burr is particularly effective in order to avoid cracking and breakage induced by a defect on the periphery of the sheet, and the invention specifies the burr height on the periphery of the sheet to "±100 $\mu$m or less". By specifying the burr height within this range, cracking and breakage due to a concentrated stress can be minimized, which concentrated stress occurs when the periphery is fixed and a stacking-induced load or thermal stress is applied on the sheet. Thus, when the resulting ceramic sheet is used as a constitutive material of a SOFC, the performances of the SOFC can be improved and the life can be markedly prolonged.

To further effectively preventing cracking and breakage, the burr height on the periphery of the sheet is preferably ±50 m or less, more preferably ±20 $\mu$m or less, typically preferably ±10 $\mu$m or less, and particularly preferably ±5 $\mu$m or less.

The above range of the dimple height is specified according to the invention for the following reasons. When a ceramic sheet is used as, for example, a solid-electrolyte film of a SOFC, a multiple plies of the sheet are stacked and a large stacking-induced load is applied onto the surface of the ceramic sheet. If a large dimple exhibits on the surface of the ceramic sheet, a stress concentrates the dimple portion to directly cause cracking and breakage. Accordingly, to avoid cracking and breakage on the sheet face due to a irregularity of the sheet surface, the maximum dimple height on the sheet surface should be specified to "100 $\mu$m or less", and the waviness height of the sheet surface may be preferably specified to "100 $\mu$m or less". These specified heights may minimize cracking and breakage formed due to concentrated stress when the sheet undergoes a stacking-induced load caused by stacking off a multiple plies of sheets or thermal stress. Thus, the ceramic sheet as a constitutive material of a SOFC can improve the performances of the SOFC and can markedly prolong its life.

To further effectively prevent cracking and breakage, the dimple height on the surface of the sheet is more preferably 80 $\mu$m or less, typically preferably 50 $\mu$m or less, and particularly preferably 20 $\mu$m or less, and the maximum waviness height is more preferably 80 $\mu$m or less, typically preferably 50 $\mu$m or less, and particularly preferably 20 $\mu$m or less.

The burr height on the periphery is specified to "±100 $\mu$m or less" and the dimple height and waviness height on the sheet surface to "100 $\mu$m or less", as above. These ranges are specified as requirements to reduce the occurrence frequency of cracking and breakage formed in the sheet under the following test condition, in consideration of a practical operating condition. In the evaluation test, a series of sheets to be tested having different burr heights, dimple heights or waviness heights are subjected to the following test under a load of 0.1 to 0.5 kg/cm$^2$ which is a usual stacking-induced load when the sheet is used as a constitutive material of a SOFC. The sample sheet is heated from room temperature to 1000° C. over 10 hours, is held at 1000° C. for 1 hour and is then cooled to room temperature; and this procedure is repeated 10 times under the above load condition. In this test, a sample exhibiting a small occurrence frequency of cracking and breakage is evaluated as good. The permissive levels of the burr, dimple and waviness are thus defined as above to provide good ceramic sheets.

The burr height, dimple height and waviness height can be determined by irradiating the sheet with a laser beam to measure reflected light, and three-dimensionally analyzing the reflected light using a laser optical three-dimensional profiling instrument. The laser optical three-dimensional profiling instrument is a non-contact analyzing system for three-dimensional micro-profiling. Using this instrument, unevenness on a sheet surface can be detected in a non-contact manner as follows. In the analysis, a laser beam is irradiated to focus on to a sheet surface, in a manner that light reflected from the sheet surface is received on the surface of a photodiode. When there is non-uniformity of the focused image due to unevenness on the sheet surface, the instrument immediately sends a signal to solve this unevenness. By this signal, an objective lens is controlled to constantly focus the image on the sheet surface. According to this configuration, when a surface of the ceramic sheet to be analyzed is irradiated with a laser beam in a direction along with the surface, irregularity on a sheet surface can be detected in a non-contact manner. The resolution of this type of instrument is generally 1 $\mu$m or less, and is 0.1 $\mu$m or less in a higher precision instrument. The use of the instrument can accurately detect the burr heights on the periphery of sheet, the dimple heights and the waviness heights on the sheet surface.

A variety of causes are known to increase burr heights on the sheet periphery. Of such burrs having high burr heights, most frequently and typically occurring burrs are burrs formed in punching of a ceramic green sheet into predetermined configurations in consideration of a shrinkage ratio (generally 10–30%) in baking, which green sheet is generally molded by the doctor blade process; burrs on the periphery of sheet which occur because the green sheet is baked, which green sheet has an internal stress occurred in punching operation and remained thereafter; and burrs formed due to uneven baking (e.g., non-uniformity of a decomposed gas emission rate, which decomposed gas is generated by thermal decomposition of a binder component).

To minimize burrs on the periphery of the sheet, it is important to minimize the heights of burrs formed during punching, as well as to minimize an internal stress occurred in the punched portion and to make the emission rate of a thermally decomposed gas uniform all over the sheet surface.

A ceramic sheet is generally produced by a process comprising the steps of punching a green sheet prepared according to, for example, the doctor blade process into a predetermined shape and baking the punched sheet. To reliably obtain a ceramic sheet satisfying the burr height requirement specified according to the invention, the burr height is minimized by implementing the punching step as described above.

Preferably, a punching blade may satisfy the following mathematical expression equation in the punching step and the punching blade may travel with a face to be punched being pressed by an elastic polymer member:

$$20° \leq \theta = \theta_1 + \theta_2 \leq 70° \text{ and } \theta_1 \leq \theta_2$$

wherein $\theta$ is an angle of blade, $\theta_1$ is an angle defined by an edge surface of the blade opposing a product sheet and a center line (X) passing a tip end of the blade in parallel to a flank portion of the blade, and $\theta_2$ is an angle defined by an edge surface of the blade opposing a residual sheet and the center line (X).

For example, FIGS. 1 to 4 are schematic sectional views each illustrating an example of the configuration of a punching member A which is capable of minimizing the burr height on the periphery of the ceramic sheet, and a punching operation using the punching member. To a blade holder 1, a blade 3 is fixed by a member 2 made of a hard material, and a hanging plate 4 made of, for example, a soft rubber is mounted at the tip portion of the hard member 2. The blade 3 is arranged in such a manner that the blade 3 does not pass through and protrude from the tip edge of the hanging plate 4 unless the hanging plate 4 is compressively deformed (FIG. 1). In the illustrated example, an elastic plate 6 covers onto the upper surface of a hard plate 5 in a sheet supporting member B which is arranged facing the punching member A, in order to more reliably fix a green sheet during punching operation. The elastic plate 6 can be omitted. A green sheet G to be punched is placed on the supporting member B and is then punched.

Figure 2:
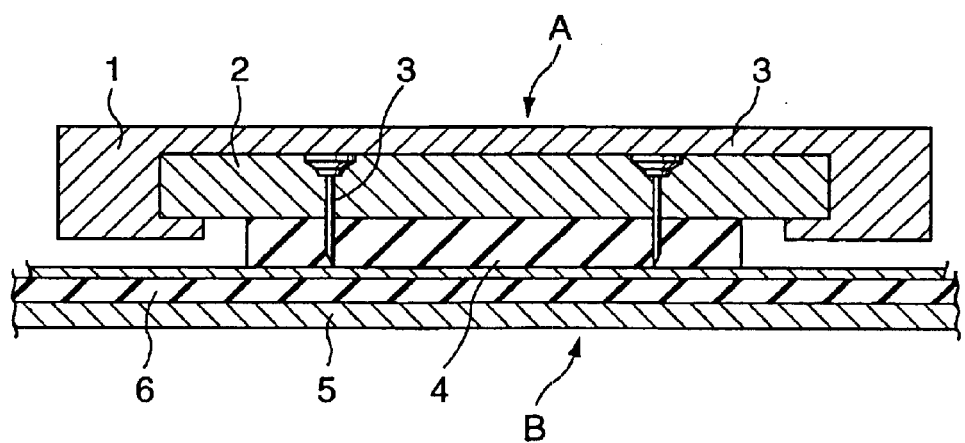

In punching of the green sheet G, the punching member A is brought from a state as illustrated in FIG. 1 into a state where the punching member A is set closer to the surface of the green sheet G placed on the sheet supporting member B in a direction substantially perpendicular to the green sheet surface. The blade 3 in the punching member A is arranged in such a manner that the blade does not protrude from the front face of the hanging plate 4 as mentioned above, and when the punching member A is brought closer to the green sheet G in the above manner, the upper surface of the green sheet G first abuts against the hanging plate 4, and the green sheet G is sandwiched between the hanging plate 4 and the elastic plate 6 in a vertical direction (FIG. 2).

Figure 3:
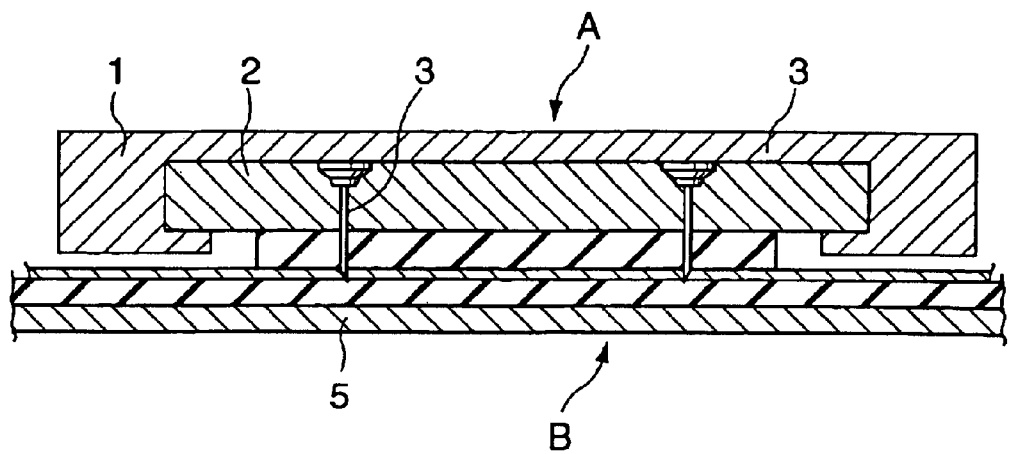
Figure 4:
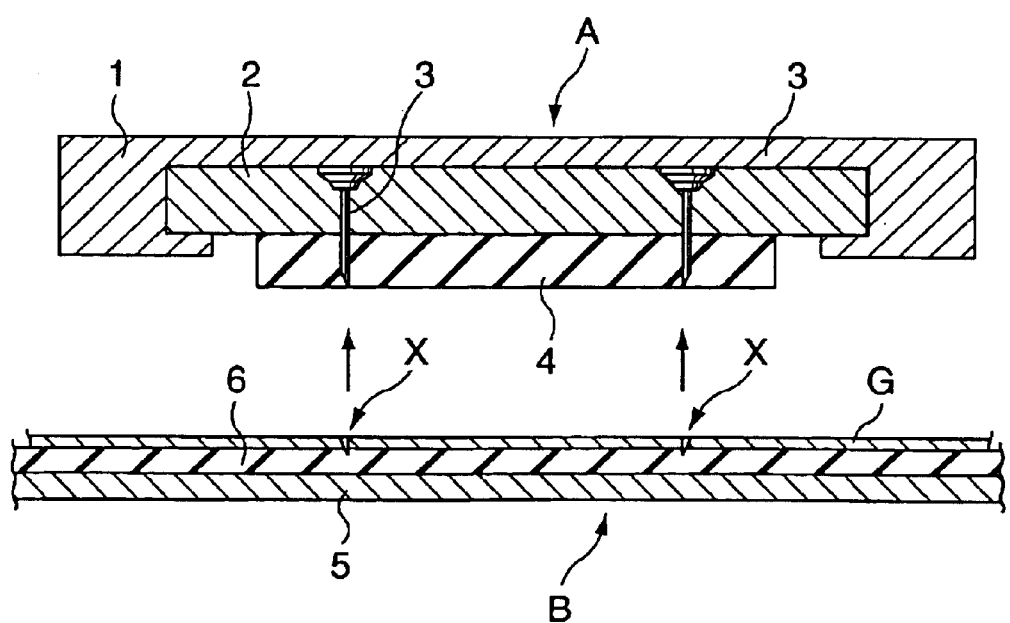

When the punching member A is further brought downward, the hanging plate 4 made of an elastic material is compressively deformed to make the blade 3 protrude in a direction toward the green sheet G. Concurrently with this, the green sheet G is fixedly supported by an elastic reaction force accompanied with the elastic deformation of the hanging plate 4 from the upper side and by an elastic reaction force exerted by the elastic plate 6 from the lower side. In this state, the green sheet is punched by the traveling blade 3 (FIG. 3).

Once the blade 3 passes through the green sheet G to punch the green sheet G, the punching member A is moved upward to retract the blade 3 away from the punched portion of the green sheet G. In this operation, the green sheet G is continuously held by elastic forces of the hanging plate 4 and the elastic plate 6 until the blade 3 is withdrawn from the green sheet G, and the green sheet G is released from the elastic forces (in FIG. 4, the symbol x denotes the punched portion).

Specifically, accompanied with traveling of the blade 3, the green sheet G is punched and withdrawn in a state where the green sheet G is fixedly held by elastic forces, thereby maintaining a high dimensional precision of punching operation and minimizing the formation of burrs.

Figure 5:
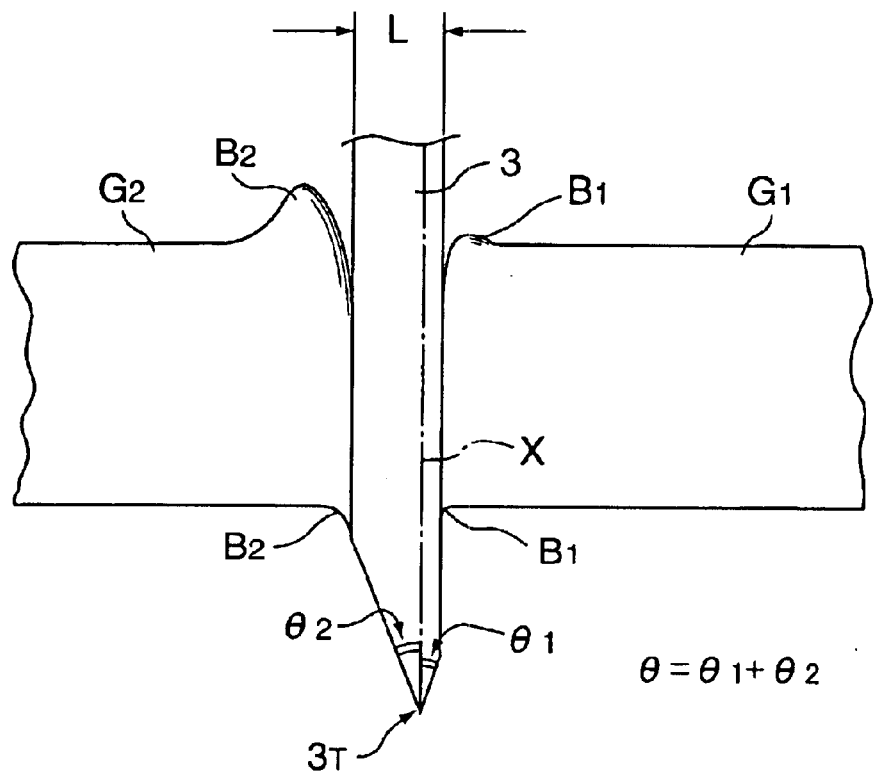
FIG. 5 is an enlarged sectional view of a punching blade under a punching operation.

Further, the punching blade 3 in this embodiment has a configuration that the angle $\theta_1$ on the side of a product sheet $G_1$ is set equal to or smaller than the angle $\theta_2$ on the side of a residual sheet $G_2$, as shown in the enlarged view of FIG. 5. As a result, a force exerted during punching in a direction of thrusting the sheet material largely acts on the $\theta_2$ side of the blade which is a relatively obtuse angle, and a force of the blade on the $\theta_1$ side which is a relatively acute angle to thrust the sheet material in a direction toward the $\theta_1$ side is relatively weakened, as shown in FIG. 5. Consequently, a burr $B_1$ formed on the $\theta_1$ side is smaller than a burr $B_2$ formed on the $\theta_2$ side. In addition, a displaced amount of the sheet material itself on the side of the resulting product sheet $G_1$ is less than that on the side of the residual sheet $G_2$ and the internal stress occurred by punching operation on the product sheet $G_1$ side is smaller than that on the residual sheet $G_2$ side. Accordingly, the deformation due to the internal stress during baking the sheet $G_1$ is smaller and the resulting product sheet exhibits less dimple and waviness on its surface.

The use of the punching blade 3 having such dimensions can minimize a burr formed on the sheet $G_1$ side and can minimize waviness and dimple formation after baking. In this configuration, the thickness (L) of the blade 3 may preferably be minimized in a range as far as a strength required by punching operation can be ensured. The thickness of the blade 3 is therefore preferably about 0.4 to 1.2 mm, and more preferably about 0.7 to 0.9 mm. The use of this type of blade can further minimize burrs and can control the burr height on the periphery of a ceramic sheet obtained by baking a green sheet to ±100 μm or less as specified in the invention, and preferably ±50 μm or less.

Figure 6:
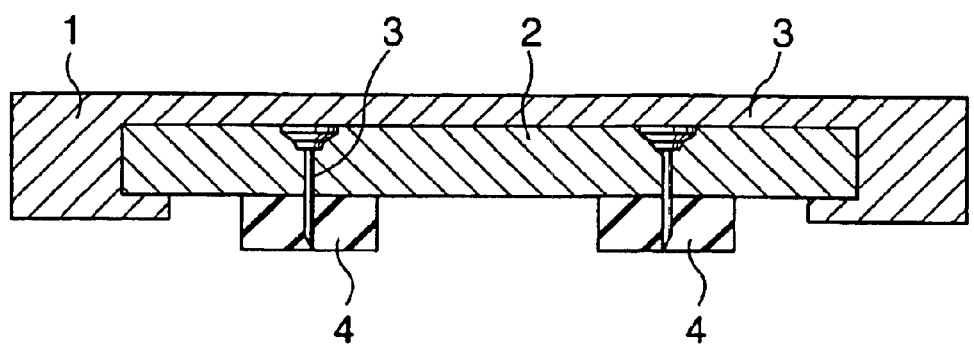
FIG. 6 is a schematic sectional view showing another punching machine for use in the invention.

FIG. 6 illustrates a modified example of the punching member A for use in the invention. The punching member A shown in FIG. 6 has substantially the same configuration as the example shown in FIG. 1, except that hanging plates are locally provided in the vicinity of the traveling paths of the blade 3.

As is obvious from the above explanation, the configuration of the punching blade is set to make the displacement of the sheet material during punching operation occur mainly on the side of the residual sheet $G_2$ to thereby reduce the amount of a protruded portion of the sheet material on the product sheet $G_1$ side and to reduce the internal stress. The absolute angles of $\theta_1$ and $\theta_2$ are not set at a predetermined value. To further reduce the burr height on the product sheet side and to perform the punching operation smoothly, however, the angle $\theta_1$ on the product sheet $G_1$ side is preferably 5° to 55°, and more preferably 10° to 35°, the angle $\theta_2$ on the residual sheet $G_2$ side is preferably 10° to 60°, and more preferably 15° to 40°, and the angle of blade $\theta$ which is the sum of the angles $\theta_1$ and $\theta_2$ is preferably 20° to 70°, and more preferably 30° to 60°. The tip end $3_T$ of the blade 3 may preferably be set on the product sheet $G_1$ side with respect to a center line X which passes the tip end $3_T$ of the blade 3 in parallel with the traveling direction of the blade 3, as illustrated in FIG. 5.

Elastic materials for use as the hanging plate 4 or the elastic plate 6 are not limited as far as the materials can fix the green sheet during punching operation by the elastic force. Such materials include, but are not limited to, hard sponges, corks, neoprene rubbers, urethane rubbers, soft vinyl chloride resins, and other materials that can be elastically deformed. Hard sponges and urethane rubbers are particularly preferred.

Since the performances of the punching machine vary depending on, for example, the thickness and dimensions of the green sheet, it is desirable to set the performances according to needs. Generally, the punching machine has a maximum pressing force of about 10 to 100 tons, a pressing speed of about 20 to 200 s.p.m.(strokes per minute), and more generally about 50 to 100 s.p.m., and a punching stroke of about 20 to 200 mm, and more generally about 30 to 60 mm. To further reduce the burr height on the periphery of the sheet according to the invented process, it is preferred to set the pressing pressure higher and the pressing speed lower than a general level, but the optimum conditions can be selected in consideration of productivity, the cost of equipment, and other parameters.

The green sheet punched to predetermined dimensions by the above process is placed on a setter, and is baked preferably under the following condition to yield a ceramic sheet having a further lower burr height and exhibiting a smaller dimple and waviness.

Alternatively, the invented ceramic sheet should meet the requirement in dimple highest on the sheet surface. The dimple may be increased by a variety of causes, and is most significantly increased by non-uniformity of baking (uneven emission rate of a decomposed gas generated by thermal decomposition of a binder component) or uneven sliding between the green sheet surface and a porous sheet surface during the shrinkage accompanied with sintering of the sheet.

To minimize the dimple height, it is important to make the emission rate of a thermally decomposed gas uniform all over the sheet surface, and to avoid adhesion of the ceramic sheet to the porous sheet or to improve sliding property of the green sheet with respect to the porous sheet during shrinkage accompanied with sintering.

The present inventors made experiments and verified that the height of a dimple formed during baking can be minimized by placing a porous sheet having a porosity of 15% to 85% and more preferably 35% to 80% and dimensions equal to or larger than the green sheet on the green sheet or interposing the green sheet between two plies of the above porous sheet, and then baking the green sheet. According to this process, the emission of the decomposed gas and sintering can uniformly proceed allover the green sheet surface due to even heat distribution and weighting effect of the porous sheet. By the same token, this process can also minimize the burr height formed in baking operation.

However, the single use of a porous sheet having the above-specified porosity is still insufficient to surely yield a ceramic sheet having a smoothness that meets the dimple height requirement and further the waviness height requirement at the levels specified in the invention. The dimple height or the waviness height may sometimes exceed the above range according to the degree of sliding of a contact surface between the porous sheet and the green sheet in sintering. This is provably caused for the following reasons.

The porous sheet has been previously baked and is used as a spacer in the sintering of the green sheet, and exhibits little shrinkage in the sintering step of the green sheet. In contrast, the green sheet shrinks to about 70% to 90% in length and to about 50% to 80% in area during sintering, as described above. In the process of sintering, there is observed a displacement of the green sheet relative to the porous sheet, particularly on the outer peripheries of the sheets. In this case, surfaces of the both sheets are nearly in ultimate contact with each other, and a local junction (adhesion) may be formed on a contact surface between the both sheets at the sintering temperature. Once such a junction occurs, the sliding between the surfaces of both sheets is inhibited and a compressive force is exerted on the green sheet surface at the junction, and a tensile force is exerted in the vicinity of the junction. The locally exerted compressive force and tensile force make the displacement of the green sheet material at the portion uneven, and this may invite dimple formation. Alternatively, when the ceramic green sheet exhibits thermally adhesive properties due to the characteristics of an organic binder component and a plasticizer component for use in molding, the green sheet may adhere to the porous sheet during sintering in some cases. In this case, the displacing of the green sheet becomes uneven for the same reasons as above, and this may invite dimple formation. The heavier the load on the green sheet is and the more uneven the load on the green sheet is, the more markedly occurs such an uneven displacement.

The present inventors made further investigations to resolve the dimple formation due to a local junction (adhesion), and found that a dimple can be minimized and an waviness can be suppressed by interposing an effective amount of a powder having a mean particle diameter of about 0.3 to 100 $\mu$m between the contact surfaces of the porous sheet and the green sheet. The powder can inhibit the junction and improve sliding property between the sheet surfaces, and can minimize local tensile force and compressive force on the contact surface between both sheets. In addition, the powder itself serves to enhance sliding, and the interposition of the powder increases gaps between the sheet surfaces to thereby enhance emission of a decomposed gas.

Such powders for use in the invention preferably have a mean particle diameter of 0.3 to 100 $\mu$m. A powder having a mean particle diameter less than 0.3 $\mu$m is too fine to effectively inhibit the junction, to effectively enhance the sliding, and to effectively enhance the emission of the decomposed gas. Particularly, an inorganic powder having an excessively small mean particle diameter itself may be adhered or fused to the porous sheet or ceramic sheet in sintering. In contrast, a coarse particle having a mean particle diameter exceeding 100 $\mu$m may increase the dimple and surface roughness of the resulting ceramic sheet, which may adversely affect printing of electrodes when practically used as a solid-electrolyte film. In view of these advantages and disadvantages, the lower limit of the mean particle diameter of the powder is more preferably 2 $\mu$m, and most preferably 5 $\mu$m, the upper limit of the mean particle diameter of the powder is more preferably 80 $\mu$m, and most preferably 60 $\mu$m. Especially preferred powders are powders containing less coarse particles, in which the particle diameter at 90% by volume of 200 $\mu$m or less, and more preferably 100 $\mu$m or less.

The powder can be either organic or inorganic, but is particularly preferably organic. Inorganic powders remain on the sheet surface even after a sintering treatment, and some types of such inorganic powders adhere to the surface of the ceramic sheet, and the adhered powders and powders that have not been adhered and remain on the surface, must be removed by a complicated process after sintering. In contrast, organic powders decompose and disappear under sintering conditions, and removal of powders after sintering is not required. On completion of sintering of the ceramic sheet, the ceramic sheet does no more adhere to the porous sheet and the organic binder component has been already decomposed and emitted, and a residual powder is not necessary. According fi to the type of the ceramic sheet, an organic powder with a small amount of an inorganic powder may be use, such that the inorganic powders remain until the final stage of sintering. When the inorganic powder is used concurrently, the proportion of the organic powder is preferably 50% by mass or more, more preferably 60% by mass or more, and most preferably 80% by mass or more.

Such organic powders for use in the invention are not limited as far as powders are decomposed and burnt out under sintering conditions, and include natural organic powders, or acrylic resin powders, melamine cyanurate powers and other sublimating resin powders, and other synthetic organic resin powders. Among them, typically preferred are powdered starches such as wheat flour, corn starch, sweet potato starch, potato starch, tapioca starch and the like. Such starches are nearly spherical fine powders with uniform particle sizes, contain almost no impurities and very satisfactorily serve as lubricants. Each of these organic powders may be used alone or in combination.

Inorganic powders for use in the invention are not limited and are preferably natural or synthetic oxides or non-oxides. Such preferred inorganic powders include, but are not limited to, powders of silica, alumina, zirconia, titania, mullite, boron nitride, silicon nitride, aluminum nitride, silicon carbide, carbon, and the like. Each of these inorganic powders may be used alone or in combination. An inorganic powder exhibiting a low adhesion to the materials of the green sheet and of the porous sheet used can be advantageously employed.

The application technique of the powder is not critical, but the powder may be preferably applied with a blush or with a buff, or be applied through a sieve. Alternatively the powder may be sprayed in the form of a dispersion containing the powder in a dispersion medium onto the sheet. The green sheet or the porous sheet may be passed through a float fluidized bed of the powder or on the surface of the powder reserved in reservoir.

The total applied amount of the powders is not critical. However, if the amount is excessively large, the powder cannot be uniformly applied onto the overall surfaces of the sheets, which invites the tendency to increase the waviness due to uneven thickness of the powder. In contrast, if the amount of the powder is excessively small, the powder cannot sufficiently serve to enhance the sliding and to enhance the emission of a decomposed gas generated in sintering, which induces tendency to form dimples. The amount of the powder is therefore preferably 0.0001 cc/cm$^2$ or more, and more preferably 0.0002 cc/cm$^2$ or more, the amount of the powder is therefore preferably 0.1 cc/cm$^2$ or less, and more preferably 0.02 cc/cm$^2$ or less, relative to the area of the ceramic green sheet to be sintered.

In baking of the green sheet, one ply of the green sheet can be baked after placing one porous sheet on one green sheet, but it is advantageous to stack plural plies of the green sheets and plural plies of porous sheets alternately and baking the stack concurrently. By this technique, the sintering operation can be more efficiently performed. To obtain a ceramic sheet which is further smooth and has less dimple and waviness, it is advantageous to make an uppermost porous sheet heavy or to place a weight on the uppermost porous sheet prior to baking. This configuration adds the effect of weight on the ceramic sheet.

Ceramics for use as materials of the ceramic sheet include, but are not limited to, zirconia, alumina, titania, aluminum nitride, borosilicate glasses, cordierite, mullite, and other single, mixed or complex oxides. The ceramics sheet of the invention is typically effectively applied to a solid-electrode film or an electrode sheet of a planar SOFC. For the solid-electrolyte film, typically preferred ceramics are zirconia ceramics. Concretely, such zirconia ceramics are zirconia ceramics including zirconia stabilized with at least one stabilizer. Such stabilizers include, for example, MgO, CaO, SrO, BaO, and other alkaline earth metal oxides; $Y_2O_3$, $La_2O_3$, $Ce_2O_3$, $Pr_2O_3$, $Nd_2O_3$, $Sm_2O_3$, $Eu_2O_3$, $Gd_2O_3$, $Tb_2O_3$, $Dy_2O_3$, $Ho_2O_3$, $Er_2O_3$, $Yb_2O_3$, and other rare-earth metal oxides; and $Sc_2O_3$, $Bi_2O_3$, and $In_2O_3$. Such zirconia ceramics may further comprise $SiO_2$, $Al_2O_3$, $Ge_2O_3$, $SnO_2$, $Ta_2O_5$, $Nb_2O_5$, and other additives.

Preferred ceramics for the solid-electrolyte film also include ceria or bismuth ceramics comprising $CeO_2$ or $Bi_2O_3$ with at least one additive such as CaO, SrO, BaO, $Y_2O_3$, $La_2O_3$, $Ce_2O_3$, $Pr_2O_3$, $Nd_2O_3$, $Sm_2O_3$, $Eu_2O_3$, $Gd_2O_3$, $Tb_2O_3$, $Dy_2O_3$, $Ho_2O_3$, $Er_2O_3$, $Yb_2O_3$, PbO, $WO_3$, $MoO_3$, $V_2O_5$, $Ta_2O_5$, and $Nb_2O_5$. In addition, $LaGaO_3$ and other gallium ceramics are also preferable as ceramics for use in a solid-electrolyte film.

Constitutive materials for use in an anode sheet include, for example, cermets of Ni, Co, Fe, or oxides of these metals with the zirconia and/or ceria, and cermets comprising the aforementioned cermets with MgO, CaO, SrO, BaO or another alkaline earth metal oxide or $MgAl_2O_4$. Constitutive materials for use in a cathode sheet include lanthanum manganate, lanthanum cobaltate, and complex oxides such as lanthanum manganate and lanthanum cobaltate whose lanthanum component is partially substituted with for example Ca or Sr, or lanthanum manganate whose manganese component is partially substituted with, for example, Co, Fe, or Cr, or lanthanum cobaltate whose lanthanum component and cobaltate component are partially substituted with, for example, Ca, Sr, Co, or Fe.

Ceramic sheets for use in a solid-electrolyte film of SOFC require higher thermal, mechanical, electrical, and chemical characteristics. To meet these requirements, a zirconium oxide (tetragonal and/or cubic zirconia) stabilized with preferably 2 to 12% by mole, more preferably 2.5 to 10% by mole, and typically preferably 3 to 8% by mole of yttrium oxide is desirable.

When the zirconia sheet is practically used as a solid-electrolyte film or an electrode sheet of SOFC, the thickness of the sheet may preferably fall in a range of 10 to 500 μm, and more preferably 50 to 300 μm to minimize electrical resistance while satisfying required strength.

The sheet may have any shape such as circular, elliptic, rectangular, rectangular with an R-shaped corner. These sheets may have one or more holes which are circular, elliptic, rectangular, rectangular with an R-shaped corner, or the like. The area of the sheet is generally 50 cm$^2$ or more, and preferably 100 cm$^2$ or more. The term "area" used herein means the total area of the sheet which includes the area of a hole when the sheet has the hole.

The process for producing the ceramic sheet is not critical. The ceramic sheet may be produced by, for example, preparing a slurry containing a ceramic material powder, an organic or inorganic binder and a dispersion medium (solvent), and where necessary a dispersing agent, a plasticizer, and other additives according to a conventional manner; applying the slurry onto a smooth sheet such as a polyester sheet to an adequate thickness by, for example, the doctor blade process, the calendering roll process, or the extrusion process; drying the applied slurry to evaporate and remove the dispersion medium to yield a green sheet; punching the green sheet to an adequate size by the above mentioned process; placing a porous sheet on the green sheet or interposing the green sheet between porous sheets with the interposition of a powder; placing the resulting green sheet and porous sheet(s) on a setter; heating and baking the green sheet at a temperature of about 1000° C. to 1600° C. for 2 to 5 hours.

To provide a more uniform surface of the resulting sheet and to further minimize the burr, dimple and waviness, the ceramic material powder for the sheet may preferably have a mean particle diameter of 0.1 to 0.8 $\mu$m and have uniform particle diameters (a small particle size distribution), i.e., a particle diameter of 5 $\mu$m or less at 90% by volume.

Binders for use in the invention are not limited and conventional organic or inorganic binders can be used. Such organic binders include, but are not limited to, ethylene-based copolymers, styrene-based copolymers, acrylate-based or methacrylate-based copolymers, vinyl acetate-based copolymers, maleic acid-based copolymers, vinyl butyral-based resins, vinyl acetal-based resins, vinyl formal-based resins, vinyl alcohol-based resins, waxes, ethyl cellulose, other cellulose, or the like From viewpoints of moldability, punching property, strength and thermal decomposition property in baking of the green sheet, typically preferred are (meth)acrylate copolymers having a number average molecular weight of preferably 2000 to 200000, and more preferably 5000 to 100000 obtained by polymerizing or copolymerizing monomer mixture including at least one monomer selected from the following group. The monomer includes methyl acrylate, ethyl acrylate, propyl acrylate, butyl acrylate, isobutyl acrylate, cyclohexyl acrylate, 2-ethylhexyl acrylate, and other alkyl acrylates each containing an alkyl group having 10 or less carbon atoms; methyl methacrylate, ethyl methacrylate, butyl methacrylate, isobutyl methacrylate, octyl methacrylate, 2-ethylhexyl methacrylate, decyl methacrylate, dodecyl methacrylate, lauryl methacrylate, cyclohexyl methacrylate, and other alkyl methacrylates each containing an alkyl group having 20 or less carbon atoms; hydroxyethyl acrylate, hydroxypropyl acrylate, hydroxyethyl methacrylate, hydroxypropyl methacrylate, and other hydroxyalkyl acrylates or hydroxyalkyl methacrylates each having a hydroxyalkyl group: dimethylaminoethyl acrylate, dimethylaminoethyl methacrylate, and other aminoalkyl acrylates or aminoalkyl methacrylates; (meth)acrylic acid, maleic acid, monoisopropyl malate, and other maleic half esters, and other carboxyl group-containing monomers. Each of these organic binders can be used alone or in combination. Of these organic binders, typically preferred are copolymers obtained from a monomer component containing 60% by mass or more of isobutyl methacrylate and/or 2-ethylhexyl methacrylate.

Inorganic binders include, but are not limited to, zirconia sol, silica sol, alumina sol, titania sol, or the like. Each of these inorganic binders can be used alone or in combination.

The proportion of the binder to the ceramic material powder is preferably 5 to 30 parts by weight, and more preferably 10 to 20 parts by weight relative to 100 parts by weight of the ceramic material powder. When the proportion of the binder is excessively low, the resulting green sheet may have insufficient strength and flexibility, in contrast, if the proportion is excessively high, the viscosity of the slurry cannot be significantly controlled and the binder component will be vigorously decomposed and emitted in large amounts in baking, and thus a uniform sheet cannot be significantly obtained.

Dispersion media for use in the production of the green sheet include, but are not limited to, water, methanol, ethanol, 2-propanol, 1-butanol, 1-hexanol, and other alcohols; acetone, 2-butanone, and other ketones; pentane, hexane, heptane, and other aliphatic hydrocarbons; benzene, toluene, xylene, ethylbenzene, and other aromatic hydrocarbons; methyl acetate, ethyl acetate, butyl acetate, and other acetic esters. Each of these dispersion media can be used alone or in combination. The amount of the dispersion medium is preferably selected within an appropriate range in consideration of the viscosity of the slurry in the preparation of the green sheet, and preferably within such a range that the viscosity of the slurry is 1 to 20 Pa.s, and more preferably 1 to 5 Pa.s.

To promote deflocculation and dispersion of the ceramic material powder, the slurry may further comprise other additives according to necessity. Such additives include, but are not limited to, dispersing agents comprising polyacrylic acid, ammonium polyacrylate, and other polymeric electrolytes, citric acid, tartaric acid, and other organic acids, copolymers of isobutylene or styrene with maleic anhydride, ammonium salts or amine salts of these copolymers, copolymers of butadiene with maleic anhydride and ammonium salts of these copolymers; plasticizers for imparting flexibility to the green sheet, including dibutyl phthalate, dioctyl phthalate, and other phthalic esters, propylene glycol, and other glycols and glycol ethers; surfactants; and antifoaming agents.

The invented ceramic sheet has satisfactory dimensional characteristics of a burr height on the sheet periphery of ±100 $\mu$m or less and/or a dimple height on the sheet surface of 100 $\mu$m or less, and preferably further has an waviness height of 100 $\mu$m or less, and is highly resistant to cracking even when a stacking-induced load or thermal stress is exerted, owing to these dimensional characteristics. In addition to these dimensional characteristics, when the preferable microscopic characteristics in the material of the ceramic sheet or on the surface of the sheet, especially, the grain sizes as determined by a scanning electron microscopic observation meet the following requirements, the resulting ceramic sheet exhibits further satisfactory performances in all the strength at ordinary temperature, strength at high temperatures, and durability of strength at high temperatures.

Specifically, typically preferred is a zirconia ceramic sheet comprising a zirconia ceramic and the zirconia ceramic is partially stabilized with 2.8 to 4.5% by mole of yttria and containing 0.1 to 2% by mass of at least one dispersed reinforcing oxide. And the grain size on the surface of the ceramic sheet has an average of 0.1 to 0.4 $\mu$m, a maximum of 0.4 to 0.8 $\mu$m, and a coefficient of variation of 30% or less, which grain size is determined by scanning electron microscopic observation. This type of zirconia ceramic sheet can exhibit very satisfactory performances in all the strength at room temperature, strength at high temperatures, and durability of strength at high temperatures.

The above configuration as preferred requirements according to the invention will now be described in detail.

The preferred ceramic material is specified as a zirconia ceramic partially stabilized with 2.8 to 4.5% by mole of yttria. This requirement is defined for the following reasons. In a zirconia ceramic having an yttria content less than 2.8% by mole, the proportion of monoclinic crystals in crystals of a sintered body increases and the zirconia is not sufficiently stabilized and satisfactorily durable strength at high temperatures may not be significantly obtained. In contrast, in a zirconia ceramic having an yttria content exceeding 4.5% by mole, the proportion of cubic crystals in crystals of a sintered body increases, the grain size and its distribution of the ceramic sheet increase, and satisfactory strength at high temperatures may not be significantly obtained.

To effectively exhibit stabilizing effect at high temperatures by action of an adequate amount of yttria and to minimize the grain size and its distribution of the ceramic sheet to thereby increase strength at high temperatures, the yttria content may be more preferably 3.0% by mole or more, and particularly preferably 3.1% by mole or more, and more preferably 4.0% by mole or less, and particularly preferably 3.8% by mole or less.

To further increase the strength at room temperature and strength at high temperatures of the zirconia ceramic, the f zirconia ceramic should be preferably stabilized with yttria in the above appropriate amount and contain 0.1 to 2% by mass of at least one dispersed reinforcing oxide relative to the total mass of the zirconia and yttria in the zirconia ceramic. It is supposed that the dispersed reinforcing oxide serves as a sintering aid and serves to decrease the sintering temperature in the preparation of the zirconia ceramic to thereby inhibit the growth of crystal particles in the sintering step. The dispersed reinforcing oxide is supposed to exist in the vicinity of interface to the crystal particles in the zirconia ceramic and to prevent sintering of crystal particles and growing to a large particle even when exposed to high temperatures for a long time and to inhibit the transition of the crystals from tetragonal to monoclinic or cubic.

A content of the dispersed reinforcing oxide less than 0.1% by mass does neither sufficiently serve as a sintering aid nor inhibit the sintering when exposed to high temperatures for a long time nor satisfactorily stabilize the crystal system. Thus, strength at room temperature and strength at high temperatures may not be significantly increased. In contrast, when the content of the dispersed reinforcing oxide exceeds 2% by mass, the dispersed reinforcing oxide itself does not sufficiently disperse, and strength at ordinary and high temperatures may not be effectively improved.

In consideration of these points, the content of the dispersed reinforcing oxide is more preferably 0.2% by mass or more, and typically preferably 0.3% by mass or more, and more preferably 1.5% by mass or less, and typically preferably 1.0% by mass or less.

Such dispersed reinforcing oxides include oxides of Group 4A elements, Group 5A elements, Group 3B elements, and Group 4B elements of the Periodic Table of Elements, such as oxides of Ti, V, Nb, Ta, Al, Ga, In, Ge, Sn, and Pb. Among them, typically preferred are oxides of Ti, Nb, Al, Ga, In, Ge, and Sn, of which titanium oxide, niobium oxide, and aluminum oxide are particularly desirable.

More preferably, the zirconia ceramic comprises 0.1 to 2% by mass of the dispersed reinforcing oxide, 0.1% or less by mass of silica, and 0.1% by mass or less of a total content of alkali metal oxides.

The silica and alkali metal oxides are molten type oxides having melting points lower than the zirconia and the dispersed reinforcing oxides. When the silica and alkali metal oxides exhibit in the vicinity of grain boundary in the zirconia ceramic, they are supposed to enhance sintering of crystal particles and growing to a coarse particle even when exposed to high temperatures for a long time and to inhibit the transition of the crystals from tetragonal to monoclinic in or cubic.

Therefore, preferably, the zirconia ceramic contain neither silica nor alkali metal oxide, but both the components inevitably contaminate a material powder of zirconia. The silica content is more preferably 0.08% by mass or less, and particularly preferably 0.03% by mass or less. The total content of alkali metal oxides is more preferably 0.05% by mass or less and particularly preferably 0.01% by mass or less. The term "total content of alkali metal oxides" used herein means the total mass of oxides of Na, K, Rb, and Cs. The silica content and total content of alkali metal oxides are respective contents in the ceramic sheet.

The grain size of the sintered sheet as defined above will be illustrated in detail. To ensure strength and durability at high temperatures at high levels, it is very important for the grain size to have an average of 0.1 to 0.4 $\mu$m, a maximum of 0.4 to 0.8 $\mu$m and a coefficient of variation of 30% or less. If the grain size has an average less than 0.1 $\mu$m and a maximum less than 0.4 $\mu$m, the resulting ceramic is liable to be insufficiently sintered. In contrast, if the grain size has an average exceeding 0.4 $\mu$m and a maximum exceeding 0.8 $\mu$m, the resulting ceramic is insufficient in strength and durability at high temperatures. If the grain size has a coefficient of variation exceeding 30%, the sintered body has low strength and durability at high temperatures and is liable to have a decreased Weibull coefficient of 10 or less. The Weibull coefficient is a parameter of a product, reflecting the degree of variation of strength, and a product having a low Weibull coefficient is evaluated as having a large variation and a low reliability.

In general consideration of strength at room temperature, strength at high temperatures, and durability at high temperatures, the grain size has more preferably an average of 0.25 to 0.35 $\mu$m, a maximum of 0.45 to 0.6 $\mu$m and a coefficient of variation of 28% or less.

The grain size in a sintered body is determined in the following manner. A photograph of the surface of the zirconia ceramic sheet is taken with a scanning electron microscope (a magnification of 10000 to 20000 times), and sizes of all the grains in the field of the photograph are determined with vernier calipers. Based on the determined and aggregated individual data, the average, maximum, minimum, standard deviation, and coefficient of variation of the grain sizes are determined. In the determination of the individual grain size, a grain on the edge of the photographic field, the whole of which does not appear in the field, is withdrawn from the object to be measured. As for a grain having different sizes according to directions, the grain size is defined as the average of lengths of the larger diameter and smaller diameter.

The zirconia ceramic mainly comprises tetragonal crystals, but it may further partially comprise cubic crystals and monoclinic crystals. However, a proportion of the monoclinic crystals exceeding 2% may enhance the phase transition from tetragonal to monoclinic when exposed to high temperatures for a long time and deteriorates the durability of strength at high temperatures.

The proportion (M) of the monoclinic crystals is simply represented by using a peak intensity ratio calculated from the peak intensity m(1,1 −1) of a monoclinic crystal (1,1, −1) plane, the peak intensity t(1,1,1) of a tetragonal crystal (1,1,1) plane, and the peak intensity c(1,1,1) of a cubic crystal (1,1,1) plane as determined through X-ray diffraction with CuKα. The proportion (M) of monoclinic crystals is thus calculated according to the following equation (1):

$$(M)=m(1,1,-1)/[t(1,1,1)+c(1,1,1)] \qquad (1)$$

The proportion (M) of monoclinic crystals is preferably 0 to 2% and more preferably 0 to 1%. From the viewpoint of transition of the crystal phase with time, the proportion (M) of monoclinic crystals is preferably about 0.05 to 1% rather than 0%. In the former case, the phase transition to monoclinic tends to decrease and the durability at high temperatures is improved.

The term "strength" used herein means the three-point bending strength determined at room temperature (15° C. to 30° C.) according to the method defined in Japanese Industrial Standards (JIS) R1601. The durability at high temperatures is determined as the ratio of the initial strength of a sample and the strength of the sample after holding at 950° C. for 1000 hours or more. A high durability at high temperatures means a small change of the strength after holding the sample sheet at high temperatures.

The ceramic sheet composed of specific zirconia ceramic and having the specific average, maximum and coefficient of variation of the grain size on the sheet surface after sintering exhibits markedly satisfactory strength at room temperature and at high temperatures and durability at high temperatures. This ceramic sheet can be effectively used as, for example, a ferrule (connector) of an optical fiber or a zirconia substrate of a printer, in addition to a solid-electrolyte film or an electrode plate of SOFC.

Among them, a zirconia ceramic containing titanium oxide, niobium oxide or aluminum oxide as the dispersed reinforcing oxide has a high electrical conductivity, and the aforementioned flat thin film sheet having fine and uniform grain sizes and having less burr, dimple, waviness and warp can exhibit a satisfactory cracking resistance even under a stacking-induced load or thermal stress and has very satisfactory strength at high temperatures and an excellent durability of strength at high temperatures. When this type of ceramic is molded into a thin film sheet having a thickness of about 0.01 to 0.5 mm, the resulting ceramic sheet can exhibit very satisfactory performances as, for example, a solid-electrolyte film of planar SOFC.

Processes for the production of the zirconia ceramic having these satisfactory characteristics are not limited, but the use of the following process can easily provide the ceramic meeting the above requirements.

The process includes the steps of preparing a slurry for the production of green sheet, molding the slurry, and sintering the molded green sheet, which slurry contains 2.8 to 4.5% by mole on solid content basis of yttria and 0.1 to 2% by mass of at least one dispersed reinforcing oxide, and the solid component of the slurry has a mean particle diameter (50% by volume diameter) of 0.05 to 0.5 $\mu$m, a 90% by volume diameter of 0.5 to 2 $\mu$m, and a critical diameter (100% by volume diameter) of 3 $\mu$m or less.

In this process, the individual oxide as the dispersed reinforcing oxide may be added as intact to the zirconia powder partially stabilized with 2.8 to 4.5% by mole of yttria, or may be added as an alkoxide, a nitrate, a carbonate, an aqueous solution of a nitrate, or an aqueous solution of a carbonate to the zirconia powder. Where necessary, the additive may be subjected to hydrolysis, filtration, washing, calcination, mixing and pulverization, and other treatments.

The ranges of the contents of the yttria and dispersed reinforcing oxide in the material, and the types of oxides that can be used as the dispersed reinforcing oxide and preferred types of such oxides are specified for the same reasons as above. The mean particle diameter and other parameters of the solid component in the slurry are specified for the following reasons.

The grain size of the resulting ceramic is affected to some extent by the particle size composition of a material powder to be used. The grain size of the sintered body becomes relatively large when a coarse material powder is used, and the grain size becomes relatively small when a fine material powder is used. To efficiently obtained a zirconia ceramic having the above specified grain size for advantageous use in the invention, the material powder for the ceramic sheet may preferably have an average particle diameter of 0.1 to 0.5 $\mu$m and have uniform particle diameters (a small particle size distribution), i.e., 90% by volume or more of the powder has a particle diameter of 1 $\mu$m or less.

However, the present inventors made further investigations, and found that the particle size composition of solid component in a slurry for the formation of a ceramic as a sintering material is more important than the particle size composition of the material powder itself to ensure the above-specified grain size as a sintered body. The present inventors verified that the use of a slurry whose solid component has a mean particle diameter (50% by volume diameter) of 0.05 to 0.5 $\mu$m, a 90% by volume diameter of 0.5 to 2 $\mu$m, and a critical diameter (100% by volume diameter) of 3 $\mu$m or less can further ensure to yield a zirconia ceramic which meets the preferred grain size requirements as a sintered body.

More preferably, the solid component in the slurry has a mean particle diameter (50% by volume diameter) of 0.1 to 0.4 $\mu$m, and a 90% by volume diameter of 0.6 to 1.5 $\mu$m.

The slurry is generally prepared by uniformly kneading and pulverizing a suspension containing the material powder and other components with a ball mill and other mixer. According to the kneading conditions (including the type and amount of a dispersing agent), part of the material powder undergoes secondary flocculation or is further pulverized, and the particle size composition of the material powder is not always identical to that of the solid component in the slurry. Accordingly, the grain size of the ceramic sheet is most affected by the particle size composition of the solid component in the slurry for use in the preparation of the green sheet, and it is important to control the particle size composition of the solid component within the above preferred range.

The particle size compositions of the material powder and the solid component in the slurry are determined by the following methods. Specifically, the particle size composition of the material powder is determined by adding 0.2% by mass of sodium metaphosphate as a dispersing agent in distilled water to yield a dispersion medium as an aqueous solution, adding 0.01 to 0.5% by mass of the material powder to about 100 cm$^3$ of the dispersion medium, subjecting the resulting mixture to an ultrasonic treatment for 1 minute to yield a dispersion, and measuring the particle size of the resulting dispersion with a laser diffraction system particle size distribution analyzer (trade name: SALD-1100, manufactured by Shimadzu Corporation, Japan). The particle size composition of the solid component in the slurry is determined by adding 0.1 to 1% by mass of the slurry to 100 cm$^3$ of a dispersion medium which is a solvent having the same composition as of the solvent in the slurry, subjecting the resulting mixture to an ultrasonic treatment for 1 minutes and determining the particle size in the same manner as above.

The above-prepared slurry is molded into a sheet by the aforementioned process, and the molded sheet is dried to evaporate and remove the dispersion medium to yield a green sheet, and the green sheet is punched into predetermined dimensions by the above process, and the punched green sheet is stacked with a porous sheet with the interposition of an effective amount of a powder as mention above and is heated and baked at about 1300° C. to 1600° C. for about 1 to 5 hours to yield a ceramic sheet. The resulting ceramic sheet has a burr height on the periphery of ±100 μm or less, and a dimple height on the surface of the sheet of 100 μm or less, and preferably has an waviness height of 100 μm or less, and is highly resistant to a stacking-induced load and thermal stress. This ceramic sheet comprises the grain size on the surface of the sheet having an average, maximum and coefficient of variation within the appropriate ranges and has satisfactory strength at room temperature, strength at high temperatures and durability at high temperatures.

As thus described, the invented ceramic sheet has the burr height on the periphery and the dimple height, and further the waviness height controlled to specific levels or less, and is highly resistant to stacking-induced loads and thermal stresses as a component such as a solid-electrolyte film or an electrode plate of a planar SOFC, and exhibits minimized cracking and breakage during operation and has a markedly prolonged life.

By specifying the ceramic material to a partially stabilized tetragonal zirconia ceramic containing a dispersed reinforcing oxide and specifying the average, maximum and coefficient of variation of the grain size as a sintered body (sheet), the invented partially stabilized tetragonal ceramic sheet has improved strength as this type of zirconia ceramics and has satisfactory strength at room temperature, strength at high temperatures and durability of strength at high temperatures.

The present invention will now be illustrated in more detail with reference to several invented examples, comparative examples and reference examples below, which are not intended to limit the scope of the invention.

In the invented examples, comparative examples and reference examples below, the particle diameters of organic powders and inorganic powders were determined by suspending a sample powder to be tested in a sodium metaphosphate aqueous solution, subjecting the resulting suspension to an ultrasonic treatment for 1 minute to yield a dispersion and measuring the particle size of the dispersion with a laser diffraction system particle size distribution analyzer (trade name: SALD-1100, available from Shimadzu Corporation, Japan).

EXAMPLE 1

Preparation of Porous Sheet

Into a nylon pot in which zirconia balls 10 mm in diameter were placed, 100 parts by mass of an alumina powder having a low sodium content and having an average particle diameter of 55 μm (trade name: AL-13, manufactured by Showa Denko K. K., Japan), 12 parts by mass of a binder composed of a methacrylate-based copolymer having an average molecular weight of 30000, a glass transition temperature of 0° C., and a solid content of 50% by mass in toluene, 2 parts by mass of dibutyl phthalate as a plasticizer, and 30 parts by mass of a mixture of toluene-isopropyl alcohol (3:2 by mass) as a dispersion medium were placed, and the resulting mixture was kneaded at about 60 rpm for 40 hours to yield a slurry. The slurry was concentrated and was defoamed, and the viscosity of the slurry was adjusted to 8 Pa.s. The resulting slurry was applied onto a polyethylene terephthalate film by the doctor blade process to yield a green sheet.

Using a continuous system punching machine (trade name: 865B, manufactured by Sakamoto Zoki Co., Ltd., Japan) with a blade unit, the above-prepared green sheet was cut to predetermined dimensions at a pressing stroke of 40 mm at a pressing speed of 80 s.p.m. (stroke per minute). The cut green sheet was placed on an alumina plate whose surface had been polished, was degreased at 500° C. and was baked at 1550° C. for 2 hours to yield a porous sheet. The porous sheet had a thickness of about 0.4 mm, a porosity of 46%, and a weight per unit area of 0.09 g/cm².

Preparation of Zirconia Green Sheet

Into a nylon pot in which zirconia balls 10 mm in diameter were placed, 100 parts by mass of a commercially available zirconia powder partially stabilized with 8% by mole of yttria (trade name: HYS-8.0, manufactured by Daiichi Kigenso Kagaku Kogyo Co., Ltd., Japan), 30 parts by mass of a binder composed of a methacrylate-based copolymer having an average molecular weight of 30000, a glass transition temperature of −8° C., and a solid content of 50% by mass in toluene, 2 parts by mass of dibutyl phthalate as a plasticizer, and 50 parts by mass of a mixture of toluene-isopropyl alcohol (3:2 by mass) as a dispersion medium were placed, and the resulting mixture was kneaded at a rate of about 60 rpm for 40 hours to yield a slurry.

The slurry was concentrated and was defoamed, and the viscosity of the slurry was adjusted to 3 Pa.s, and the resulting slurry was passed through a 200-mesh filter and was applied onto a polyethylene terephthalate film by the doctor blade process to yield a green sheet.

Using the continuous system punching machine with a blade unit, the above-prepared green sheet was cut to a 135 mm×135 mm square piece at a pressing stroke of 40 mm at a pressing speed of 80 s.p.m. (stroke per minute). The blade unit was composed of a single edged 135 mm×135 mm square new cutter blade (manufactured by Nakayama Paper Equipment Co., Ltd., Japan) having a blade angle θ of 57.5°, $\theta_1$ of 26.5°, and $\theta_2$ of 31° mounted onto a plywood, and a hard green rubber (trade name: KSA-17, manufactured by Nakayama Paper Equipment Co., Ltd., Japan) mounted on the plywood as a hanging plate(elastic plate).

Preparation of Zlrconia Sheet

The above-prepared 150 mm×150 mm square porous sheet was placed on a setter, and a wheat flour having an average particle diameter of 20 Am and a 90% by volume diameter of 64 μm was sprinkled onto the porous sheet and was uniformly flattened with a blush. The average amount of the applied wheat flour was 0.0008 cc/cm². Onto the wheat flour, the above-prepared 135 mm×135 mm square zirconia green sheet was placed on condition that the periphery of the green sheet did not protrude from the porous sheet, and onto the green sheet, another portion of the wheat flour was sprinkled and was uniformly flattened in the same manner as above, and thereonto, another ply of the porous sheet was overlaid. The resulting stack was placed in an electric furnace and was baked at 1450° C. for 3 hours to yield an about 100 mm×100 mm square zirconia sheet. 300 μm thick.

The prepared zirconia sheet was smooth and exhibited negligible waviness and dimple.

EXAMPLE 2

Preparation of Porous Sheet

A 150 mm×150 mm square porous sheet having a thickness of about 0.3 mm and a porosity of 40% was prepared in the same manner as in Example 1, except that the thickness of the applied slurry was adjusted and the baking temperature was changed to 1585° C.

Preparation of Zirconia Green Sheet

A 135 mm×135 mm square zirconia green sheet was prepared in the same manner as in Example 1, except that a green sheet prepared in the same manner as in Example 1 was cut with a double edged blade (a PET punching blade, manufactured by Nakayama Paper Equipment Co., Ltd., Japan) having a blade angle θ of 43°, $θ_1$ of 21.5°, and $θ_2$ of 21.5°.

Preparation of Zirconia Sheet

The above-prepared porous sheet was placed on a setter, and a corn starch having an average particle diameter of 14 μm and a 90% by volume diameter of 22 μm was sprinkled onto the porous sheet and was uniformly flattened with a blush. The average amount of the applied corn starch was 0.0005 cc/cm². The above-prepared zirconia green sheet was placed on the sprinkled corn starch, and thereonto, another portion of the corn starch was sprinkled and was uniformly flattened in the same manner as above. By repeating this procedure five times, a total of ten plies including five plies of the porous sheets and five plies of the zirconia green sheets were alternately stacked with the interposition of the corn starch. At last, the porous sheet was overlaid on the stack with the interposition of corn starch, and the resulting stack was placed in an electric furnace and was baked at 1450° C. for 3 hours to yield an about 100 mm×100 mm square zirconia sheet 300 μm thick which was stabilized with 8% by mole of yttria.

The prepared five plies of zirconia sheets were smooth and exhibited negligible no waviness and dimple.

EXAMPLE 3

A green sheet was prepared in the same manner as in Example 1, except that a commercially available zirconia powder stabilized with 3% by mole of yttria (trade name: HSY-3.0, manufactured by Daiichi Kigenso Kagaku Kogyo Co., Ltd., Japan) was used and that the thickness of the applied slurry was changed. The prepared green sheet was cut to an annular shape having an outer diameter of about 160 mm and an inner diameter of about 26 mm in the same manner as in Example 2, except that a blade unit composed of a double-edged specular-finished blade having a blade angle θ of 30°, $θ_1$ of 15°, and $θ_2$ of 15° was employed.

By using five plies of the above prepared green sheets and using disc porous sheets having an outer diameter of about 170 mm, the green sheets were baked in the same manner as in Example 2 to yield annular zirconia sheets stabilized with 3% by mole of yttria and having an outer diameter of about 120 mm, an inner diameter of about 20 mm, and a thickness of about 100 m

EXAMPLE 4

A nickel-zirconia green sheet was prepared in the same manner as in Example 1, except that a mixture of 60% by mass of a nickel oxide powder (manufactured by Kishida Chemicals Co., Ltd., Japan) and 40% by mass of a zirconia powder stabilized with 8% by mole of yttria (trade name: HSY-8.0) was used and that the binder was used in a proportion of 13 parts by mass.

The above-prepared green sheet was cut to a 175 mm×175 mm square sheet in the same manner as in Example 1, except that the blade used in Example 1 was provided with an orange rubber (trade name: orange, manufactured by Nakayama Paper Equipment Co., Ltd., Japan) as a hanging plate. Three plies of the green sheets and four plies of porous sheets each composed of a nickel aluminate spinel having a porosity of 15% were alternately stacked in such a manner that each green sheet was sandwiched between two porous sheets. The resulting stack was placed on an alumina setter and was baked at 1350° C. for 3 hours to yield an about 150 mm×150 mm square nickel-zirconia sheet about 400 μm thick.

EXAMPLE 5

An alumina green sheet was obtained in the same manner as in Example 1, except that a powder comprising an alumina powder (trade name: AL-160SG, manufactured by Showa Denko K. K., Japan) and 0.5% by mass of magnesium oxide was employed.

The above-prepared green sheet was cut to a 120 mm×120 mm square sheet in the same manner as in Example 1, except that a blade unit composed of a dual blade having a blade angle θ of 51°, $θ_1$ of 25.5°, and $θ_2$ of 25.5° was employed. The cut green sheet was placed on an alumina setter and was baked at 1575° C. for 3 hours to yield an about 100 mm×100 mm square alumina sheet about 630 μm thick.

Comparative Example 1

A green sheet was prepared in the same manner as in Example 1, and was cut to a 135 mm×135 mm square sheet using a die, and the cut green sheet was baked in the same manner as in Example 1 to yield an about 100 mm×100 mm square sheet about 300 μm thick.

Comparative Example 2

A green sheet was prepared and was cut in the same manner as in Example 1, except that the blade used herein included no hanging plate. The cut sheet was then baked in the same manner as in Example 1 to yield an about 100 mm×100 mm square sheet about 300 μm thick.

Comparative Example 3

A green sheet was prepared and was cut in the same manner as in Example 1, except that the blade used had a blade angle θ of 66.5°, $θ_1$ of 35.5°, and $θ_2$ of 31°. The cut sheet was baked in the same manner as in Example 2 to yield an about 100 mm×100 mm square sheet about 300 μm thick.

Reffrence Example 1

A green sheet was prepared and was cut in the same manner as in Example 3, except that the blade used had a blade angle θ of 23°, $θ_1$ of 11.5°, and $θ_2$ of 11.5°, the cut sheet was baked in the same manner as in Example 3 to yield an annular sheet having an outer diameter of about 120 mm, an inner diameter of about 20 mm, and a thickness of about 100 μm. However, after 500 shots cutting, the blade was worn out from use, thus resulting poor cutting performance. Another ply of the green sheet was cut with the blade after 500 shots cutting, and the resulting cut sheet was baked in the same manner as above.

Comparative Example 4

A green sheet was prepared and was cut in the same manner as in Example 4, except that the blade used had a blade angle θ of 71°, $θ_1$ of 35.5°, and $θ_2$ of 35.5°. The cut sheet was then baked in the same manner as in Example 4 to yield an about 150 mm×150 mm square nickel-zirconia sheet about 400 μm thick.

Reference Example 2

A green sheet was prepared and was cut in the same manner as in Example 5, except that the blade used had a thickness of 1.4 mm. The cut sheet was then baked in the same manner as in Example 5 to yield an about 100 mm×100 mm square alumina sheet about 630 μm thick.

EXAMPLE 6

A zirconia green sheet about 300 μm thick was prepared in the same manner as in Example 3, except that the thickness of applied slurry was changed. The green sheet was cut using the same blade as in Example 2 to yield a 400 mm×400 mm square green sheet.

Separately, a 420 mm×420 mm square porous sheet was prepared in the same manner as in Example 1, and was placed on a setter. A wheat flour having an average particle diameter of 20 μm and a 90% by volume diameter of 64 μm was sprinkled onto the porous sheet and was uniformly flattened with a blush. The average amount of the applied wheat flour was 0.0008 cc/cm$^2$. Onto the sprinkled wheat flour, the above-prepared 400 mm×400 mm square zirconia green sheet was placed in such a manner that the periphery of the green sheet did not protrude from the porous sheet, and onto the green sheet, another portion of the wheat flour was sprinkled and was uniformly flattened in the same manner as above, and thereonto, another ply of the porous sheet was overlaid. The resulting stack was placed in an electric furnace and was baked at 1400° C. for 2 hours to yield an about 300 mm×300 mm square zirconia sheet about 220 μm thick.

The prepared zirconia sheet was smooth and exhibited negligible waviness and dimple.

Comparative Example 5

A zirconia sheet was prepared in the same manner as in Example 6, except that no wheat flour was sprinkled in the stacking of the porous sheets and the zirconia green sheet prior to baking. The resulting zirconia sheet exhibited mild waviness and several large dimples on the sheet surface.

EXAMPLE 7

Preparation of Porous Sheet

A 138 mm×138 mm square porous sheet having a thickness of 0.3 mm, a porosity of 42%, and a weight per unit area of 0.07 g/cm$^2$ was prepared in the same manner as in Example 1, except that the thickness of the applied slurry was adjusted and the baking temperature was changed to 1575° C.

Preparation of Zirconia Sheet

The above-prepared porous sheet was placed on a setter, and a corn starch having an average particle diameter of 14 and a 90% by volume diameter of 22 μm was sprinkled onto the porous sheet and was uniformly flattened with a blush. The average amount of the applied corn starch was 0.0005 cc/cm$^2$. A 135 mm×135 mm square zirconia green sheet was prepared in the same manner as in Example 6 and was placed on the sprinkled corn starch, and thereonto, another portion of the corn starch was sprinkled and was uniformly flattened in the same manner as above. By repeating this procedure five times, a total of ten plies including five plies of the porous sheets and five plies of the zirconia green sheets were alternately stacked with the interposition of the corn starch. At last, another ply of the porous sheet was overlaid on the stack with the interposition of the corn starch, and the resulting stack was placed in an electric furnace and was baked at 1400° C. for 2 hours to yield five plies of about 100 mm×100 mm square zirconia sheets.

The prepared five plies of zirconia sheets were smooth and exhibited negligible waviness and dimple.

Comparative Example 6

Five plies of zirconia sheets were prepared in the same manner as in Example 7, except that no corn starch was interposed between the porous sheets and the zirconia green sheets prior to baking. Of the prepared zirconia sheets, the lowermost zirconia sheet exhibited cracking and several large dimples on the surface of the sheet. The cracking was probably caused by adhesion of the zirconia sheet to the porous sheet.

EXAMPLE 8

Preparation of Porous Sheet

A porous green sheet was prepared and was baked in the same manner as in Example 1, except that a total of 100 parts by mass of a mixture including 64 parts by mass of an alumina powder having a low sodium content and having an average particle diameter of 55 μm (trade name: AL-13), 16 parts by mass of an alumina powder having a low sodium content and having an average particle diameter of 0.6 μm (trade name: AL-160SG), and 20 parts by mass of carbon black as a pore-forming agent was used. As a result, an about 280 mm×280 mm square porous sheet having a thickness of 0.5 mm, a porosity of 60%, and a weight per unit area of 0.08 g/cm$^2$ was obtained.

Preparation of Zirconia Green Sheet

A green sheet about 200 μm thick was obtained in the same manner as in Example 1, except that the thickness of the applied slurry was adjusted. The green sheet was then cut to predetermined dimensions in the same manner as in Example 1.

Preparation of Zirconia Sheet

The above-prepared 280 mm×280 mm square porous sheet was placed on a setter, and a mixture of 80% by mass of a potato starch having an average particle diameter of 41 μm and a 90% by volume diameter of 71 μm and 20% by mass of an.,alumina powder having an average particle diameter of 55 μm was sprinkled onto the porous sheet, and was uniformly flattened with a blush. The average amount of the applied mixture was 0.002 cc/cm$^2$. The above prepared 260 mm×260 mm square zirconia green sheet was placed on the sprinkled powdered mixture, and thereonto, another portion of the powdered mixture was sprinkled and was uniformly flattened in the same manner as above. By repeating this procedure four times, a total of eight plies including four plies of the porous sheets and four plies of the zirconia green sheets were alternately stacked with the interposition of the powdered mixture. At last, another ply of the porous sheet was overlaid on the stack with the interposition of the powdered mixture, and the resulting stack was placed in an electric furnace and was baked at 1400° C. for 2 hours to yield four plies of about 200 mm×200 mm square zirconia sheets.

The prepared four zirconia sheets were smooth and exhibited negligible waviness and dimple.

EXAMPLE 9

A zlrconia sheet was prepared in the same manner as in Example 7, except that instead of the corn starch, an alumina powder having an average particle diameter of 55 μm and a 90% by volume diameter of 100 μm was applied in an amount of about 0.01 cc/cm².

The alumina powder was attached onto the surface of the baked zirconia sheet and was removed by cleaning. The zirconia sheet itself was smooth and exhibited negligible waviness and dimple.

Reference Example 3

A zirconia sheet was prepared in the same manner as in Example 9, except that an alumina powder having an average particle diameter of 0.21 μm and a 90% by volume diameter of 0.9 μm was used. The alumina powder was firmly adhered to the surface of the prepared zirconia sheet and could not be removed even by ultrasonic cleaning.

Reference Example 4

A zirconia sheet was prepared in the same manner as in Example 9, except that an alumina powder having an average particle diameter of 180 μm was used. The prepared zirconia sheet exhibited dimples and waviness on overall the surface due to the interposition of the coarse alumina powder.

Reference Example 5

A zirconia sheet was prepared in the same manner as in Example 9, except that the alumina powder sprinkled onto the porous sheets and zirconia green sheets while passing the alumina powder through a 200-mesh wire net with vibration in an amount of 0.2 cc/cm². The prepared ceramic sheet had significant dimples and large waviness. This is provably because the amount of the applied alumina powder in baking was excessively large and the thickness of the applied powder was uneven.

Reference Example 6

A zirconia sheet was prepared in the same manner as in Example 9, except that, prior to the baking operation, the alumina powder sprinkled over the surfaces of the porous sheets and zirconia green sheet was removed to an amount of applied powder of 0.00001 cc/cm² by blowing, and then the porous sheets and the zirconia green sheet were stacked. The resulting zirconia sheet was partially adhered to the porous sheets and had several large dimples.

Comparative Example 7

Zirconia green sheets were prepared in the same manner as in Example 6, and a wheat flour having an average particle diameter of 20 μm and a 90% by volume diameter of 64 μm was sprinkled onto the zirconia green sheets, and five plied of the zirconia green sheets were stacked and were baked under the same condition as in Example 6 without interposition of porous sheets. The sintered sheets were adhered to one another and could not be separated into individual sheets.

EXAMPLE 10

Preparation of Porous Sheet

Into a nylon pot in which zirconia balls 10 mm in diameter were placed, 100 parts by mass of an alumina powder having a low sodium content and having an average particle diameter of 0.6 μm (trade name: AL-160SG), 18 parts by mass of a binder composed of a methacrylate-based copolymer having an average molecular weight of 30000, a glass transition temperature of 0° C., and a solid content of 50% by mass in toluene, 2 parts by mass of dibutyl phthalate as a plasticizer, and 50 parts by mass of a mixture of ethyl acetate-toluene (3:2 by mass) as a dispersion medium were placed, and the resulting mixture was kneaded at a rate of about 60 rpm for 40 hours to yield a slurry. The slurry was concentrated and defoamed, and the viscosity of the slurry was adjusted to 4 Pa.s. The resulting slurry was applied onto a polyethylene terephthalate film by the doctor blade process to yield a green sheet.

The above-prepared green sheet was cut to a 175 mm×175 mm square sheet in the same manner as in Example 1. After degreasing at 500° C., the cut sheet was baked under the same condition as in Example 1 to yield a porous sheet. The porous sheet had some warp and was sandwiched between polished dense alumina plates, and was subjected to re-baking at 1450° C. to straighten the warp. The resulting porous sheet was an about 142 mm×142 mm square and had a thickness of about 0.2 mm, a porosity of 20%, and a mass per unit area of 0.06 g/cm².

Preparation of Zirconia Sheet

Four zirconia sheets were prepared in the same manner as in Example 8, except that the above-prepared porous sheet was used. The prepared zirconia sheets were smooth and exhibited negligible waviness and dimple.

Comparative Example 8

A zirconia sheet was prepared in the same manner as in Example 6, except that a dense alumina sheet having a mass of 2 g/cm² and a porosity of 1% or less was employed instead of the porous sheet used in Example 6.

The prepared zirconia sheet had a myriad of small creases and could not be practically used.

Comparative Example 9

A zirconia sheet was prepared in the same manner as in Comparative Example 8, except that no wheat flour was applied. The resulting zirconia sheet had cracks and could not be practically used.

Evaluation Test Example 1

The burr heights, waviness heights, and dimple heights of the individual sheets obtained in Examples 1 to 5, Comparative Examples 1 to 4, and Reference Example 1 to 2, and each 20 plies of the sheets obtained in Examples 6 to 10 and Comparative Examples 5 and 8, and Reference Example 4 to 6 were measured in the following manner. The surface of a sample sheet was irradiated with a laser beam using a laser optical non-contact system three-dimensional profiling analyzer (trade name: MICROFOCUS EXPERT TYPE UBC-14, manufactured by UBM) to measure a reflected light, and the reflected light was three-dimensionally analyzed. The measurement was performed at a pitch of 0.1 mm by using a light source of a semiconductor laser (780 nm) with a spot diameter of 1 μm, and a vertical resolving power of 0.01 μm.

The results are shown in Tables 1 and 2. The sheets obtained in Comparative Examples 8 and Reference Example 5 had an extremely large waviness and the burr heights of these sheets could not be determined.

Evaluation Test Example 2

The sheets obtained in Examples 1 to 5, Comparative Examples 1 to 4, and Reference Example 1 to 2 were subjected to a test. A sample sheet was interposed between two alumina plates (trade name: SSA-S, manufactured by Nikkato K.K., Japan) having flat faces in parallel with each other, and resulting stack was placed on an alumina planking, and onto the stack, alumina setters as weights were overlaid in such a manner that a load of 0.1 kgf/cm$^2$ or 0.5 kgf/cm$^2$ per unit area was applied onto the sheet.

In this state, the sheet was heated from room temperature to 1000° C. over 10 hours and was held at 1000° C. for 1 hour and was cooled to room temperature. This procedure was repeated, and the formation of cracking and breakage was observed by visual inspection and a color check. The results are shown in Table 1.

Evaluation Test Example 3

The sheets obtained in Examples 6 to 10 and Comparative Examples 5 and 8, and Reference Example 4 to 6 were subjected to a test. A sample sheet was interposed between two alumina plates (trade name: SSA-S) having flat faces in parallel with each other, and the resulting stack was placed on an alumina planking, and a load was applied onto the stack in such a manner that a 0.2 kgf/cm$^2$ load per unit area was applied onto the overall surface of the sheet. In this state, the sheet was heated from room temperature to 1000° C. over 10 hours and was held at 1000° C. for 1 hour and was cooled to room temperature. This procedure was repeated 10 times, and the number of occurrences of cracking was determined. The results are shown in Table 2.

EXAMPLE 11

To 100 parts by mass of a zirconia powder partially stabilized with 3.0% by mole of yttria (trade name: OZC-3.0 YD, manufactured by Sumitomo Osaka Cement Co., Ltd., Japan), a mixture of 60 parts by mass of isopropyl alcohol and titanium isopropoxide was added so that added amount of titanium oxide was 0.3 part by mass, and the isopropyl alcohol was removed by distillation under reduced pressure with a rotatory evaporator, and the resulting mixture was further dried under reduced pressure and was calcined at 800° C. to yield a zirconia powder partially stabilized with 3.0% by mole of yttria and containing 0.3% by mass of dispersed titanium oxide. The zirconia powder had a silica content of 0.003% by mass and a sodium oxide content of 0.001% by mass.

Into a nylon pot in which zirconia balls 5 mm in diameter were placed, 100 parts by mass of the above-prepared zirconia powder, 14 parts by mass of a binder composed of a methacrylate-based copolymer having an average molecular weight of 30000 and a glass transition temperature of −8° C., 2 parts by mass of dibutyl phthalate as a plasticizer, and 50 parts by mass of a solvent mixture of toluene-isopropyl alcohol (3:2 by mass) as a dispersion medium were placed, and the resulting mixture was kneaded at a speed of about 60 rpm which was 70% of the critical speed for 40 hours to yield a slurry.

A portion of the slurry was sampled and was diluted with a solvent mixture of toluene-isopropyl alcohol (3:2 by mass), and the particle size distribution of solid content in the diluted slurry was determined with the laser diffraction system particle size distribution analyzer (trade name: SALD-1100). The solid content was then found to have an average particle diameter (50% by volume diameter) of 0.53 μm, a 90% by volume diameter of 1.25 μm and a critical particle diameter (100% by volume diameter) of 2.95 μm.

The slurry was concentrated and defoamed and the viscosity of the slurry was adjusted to 3 Pa.s (23° C.), and the resulting slurry was passed through a 200-mesh filter and was applied onto a polyethylene terephthalate (PET) film by the doctor blade process to yield a green sheet about 0.38 mm thick. The green sheet was cut in the same manner as in Example 2 to yield an about 125 mm×125 mm square zirconia green sheet.

Separately, a porous sheet having a gas permeability of 0.003 m/s kPa was prepared in the same manner as in

TABLE 1

| | Maximum burr height (μm) | | Dimple height (μm) | Waviness height (μm) | Load-applying test (1000° C.) | | | |
|---|---|---|---|---|---|---|---|---|
| | Outer periphery | Inner periphery | | | 0.1 kgf/cm$^2$ | | 0.5 kgf/cm$^2$ | |
| Example 1 | 27 | | 30 | 40 | 10 times: | no cracking | 10 times: | no cracking |
| Example 2 | 18 | | 40 | 15 | 10 times: | no cracking | 10 times: | no cracking |
| Example 3 | 1 | 3 | 40 | 50 | 10 times: | no cracking | 10 times: | no cracking |
| Example 4 | 3 | | 30 | 60 | 10 times: | no cracking | 10 times: | no cracking |
| Example 5 | 68 | | 50 | 100 | 10 times: | no cracking | 10 times: | no cracking |
| Comp.Ex. 1 | 127 | | 35 | 85 | 8 times: | cracking | 5 times: | cracking |
| Comp.Ex. 2 | 181 | | 70 | 40 | 5 times: | cracking | 3 times: | cracking |
| Comp.Ex. 3 | 118 | | 35 | 40 | 10 times: | cracking | 6 times: | cracking |
| Comp.Ex. 4 | 139 | | 40 | 40 | 6 times: | cracking | 4 times: | cracking |
| Ref.Ex. 1 | −5 after 500 shots: −156 | −14 after 500 shots: −214 | 25 | 30 | 10 times: 4 times: | no cracking cracking | 10 times: 1 time: | cracking cracking |
| Ref.Ex. 2 | 205 | | 45 | 120 | 7 times: | cracking | 6 times: | cracking |

TABLE 2

| | Burr height (μm) | Dimple height (μm) | Waviness height (μm) | Occurrence of cracking after load-applying test (% in 20 sheets) |
|---|---|---|---|---|
| Example 6 | 28 | 20 | 30 | 0 |
| Example 7 | 2 | 15 | 15 | 0 |
| Example 8 | 6 | 15 | 20 | 0 |
| Example 9 | 34 | 35 | 30 | 0 |
| Example 10 | 11 | 30 | 40 | 0 |
| Comp.Ex. 5 | 43 | 180 | 100 | 30 |
| Comp.Ex. 8 | — | 200 | 230 | 80 |
| Ref.Ex. 4 | 37 | 150 | 120 | 20 |
| Ref.Ex. 5 | — | 120 | 170 | 25 |
| Ref.Ex. 6 | 24 | 160 | 80 | 40 |

Example 7 and was placed on a setter, and a corn starch was sprinkled onto the porous sheet and was uniformly flattened with a blush. Onto the sprinkled corn starch, the above-prepared square zirconia green sheet was overlaid in such a manner that the periphery of the green sheet did not protrude from the porous sheet. Onto the green sheet, another portion of the corn starch was sprinkled and was uniformly flattened in the same manner as above, and thereonto, another ply of the porous sheet was overlaid. After degreasing, the green sheet was calcined at 1425° C. for 3 hours to yield an about 100 mm×100 mm×0.3 mm square zirconia sheet partially stabilized with 3.0% by mole of yttria and containing 0.3% by mass of titanium oxide.

EXAMPLE 12

A zirconia powder partially stabilized with 3.2% by mole of yttria and containing 0.8% by mass of dispersed titanium oxide was prepared in the same manner as in Example 11, except that 60 parts by mass of isopropyl alcohol and titanium isopropoxide was added, so that added amount of titanium oxide was 0.8 part by mass, to 100 parts by mass of a zirconia powder partially stabilized with 3.2% by mole of yttria (trade name: OZC-3.2YC, manufactured by Sumitomo Osaka Cement Co., Ltd., Japan).

Using the above-prepared zirconia powder, an about 100 mm×100 mm×0. 3 mm square zirconia sheet partially stabilized with 3.2% by mole of yttria and containing 0.8% by mass of titanium oxide was prepared in the same manner as in Example 11.

EXAMPLE 13

A zirconia powder partially stabilized with 3.2% by mole of yttria and containing 0.5% by mass of dispersed niobium oxide was prepared in the same manner as in Example 11, except the following. Niobium hydroxide was added with water to 100 parts by mass of a zirconia powder partially stabilized with 3.2% by mole of yttria (trade name: OZC-3.2YC). Niobium hydroxide was obtained by adding niobium chloride to 60 parts by mass of water, so that added amount of niobium oxide was 0.5 part by mass, and hydrolysing niobium chloride. Using the above-prepared zirconia powder, an about 100 mm×100 mm×0.3 mm square zirconia sheet partially stabilized with 3.2% by mole of yttria and containing 0.5% by mass of niobium oxide was prepared in the same manner as in Example 11.

EXAMPLE 14

A zirconia powder partially stabilized with 3.5% by mole of yttria and containing 1.0% by mass of dispersed aluminum oxide was prepared in the same manner as in Example 11, except that 1.0 part by mass of an aluminum oxide powder (trade name: TM-DAR, manufactured by Taimei Chemicals Co., Ltd., Japan) was added to 100 parts by mass of a zirconia powder partially stabilized with 3.5% by mole of yttria (trade name: HSY-3.5, manufactured by Dajichi Kigenso Kagaku Kogyo Co., Ltd., Japan).

Using the above-prepared zirconia powder, an about 100 mm×100 mm×0.3 mm square zirconia sheet partially stabilized with 3.5% by mole of yttria and containing 1.0% by mass of aluminium oxide was prepared in the same manner as in Example 11.

EXAMPLE 15

A zirconia powder partially stabilized with 4.0% by mole of yttria and containing 0.6% by mass of dispersed titanium oxide and 0.6% by mass of dispersed aluminium oxide was prepared in the same manner as in Example 11, except that 0.6 part by mass of a titanium oxide powder (trade name: highly purified titanium oxide PF-10, manufactured by Ishihara Sangyo Kaisha, Ltd., Japan) and 0.6 part by mass of an aluminium oxide powder (trade name: TM-DAR) were added to 100 parts by mass of a zirconia powder partially stabilized with 4.0% by mole of yttria (trade name: HSY-4.0, manufactured by Daiichi Kigenso Kagaku Kogyo Co., Ltd., Japan).

Using the above-prepared zirconia powder, an about 100 mm×100 mm×0.3 mm square zirconia sheet partially stabilized with 4.0% by mole of yttria and containing 0.6% by mass of titanium oxide and 0.6% by mass of aluminium oxide was prepared in the same manner as in Example 11.

Reference Example 7

A zirconia sheet partially stabilized with 3.0% by mole of yttria was prepared in the same manner as in Example 11, except that only 100 parts by mass of zirconia powder partially stabilized with 3.0% by mole of yttria (trade name: OZC-3.0YD) alone was used.

Reference Example 8

A zirconia powder partially stabilized with 3% by mole of yttria and containing 0.05% by mass of dispersed titanium oxide was prepared in the same manner as in Example 11, and using this zirconia powder, a zirconia sheet partially stabilized with 3% by mole of yttria and containing 0.05% by mass of titanium oxide was prepared in the same manner as in Example 11.

Reference Example 9

A zirconia powder partially stabilized with 3.2% by mole of yttria and containing 3% by mass of dispersed titanium oxide was prepared in the same manner as in Example 12, and using this zirconia powder, a zirconia sheet partially stabilized with 3.2% by mole of yttria and containing 3% by mass of titanium oxide was prepared in the same manner as in Example 12.

Reference Example 10

A zirconia powder partially stabilized with 3.5% by mole of yttria and containing 0.5% by mass of dispersed niobium oxide, 0.3% by mass of silica and 0.2% by mass of sodium hydroxide was prepared in the same manner as in Example 14, except the following. Niobium hydroxide was added with water to 100 parts by mass of a zirconia powder partially stabilized with 3.2% by mole of yttria . Niobium hydroxide was obtained by adding niobium chloride to 60 parts by mass of water, so that added amount of niobium oxide was 0.5 part by mass, and hydrolysing niobium chloride. A silica sol (trade name: SNOW TEX, manufactured by Nissan Chemical Industries, Ltd., Japan) was added to the zirconia powder, so that added amount of silicon oxide was 0.3 part by mass, and sodium hydroxide was added to the zirconia powder so that added amount of sodium oxide was 0.2 part by mass.

Using the above-prepared zirconia powder, an about 100 mm×100 mm×0.3 mm square zirconia sheet partially stabilized with 3.5% by mole of yttria and containing 0.5% by mass of niobium oxide, 0.3% by mass of silica, and 0.2% by mass of sodium oxide was prepared in the same manner as in Example 14.

Reference Example 11

A zirconia powder partially stabilized with 2% by mole of yttria and containing 1% by mass of dispersed aluminum oxide was prepared in the same manner as in Example 14, except that a zirconia powder partially stabilized with 2% by mole of yttria (trade name: HSY-2.0, manufactured by Daiichi Kigenso Kagaku Kogyo Co., Ltd., Japan) were employed.

Using the above-prepared zirconia powder, an about 100 mm×100 mm×0.3 mm square zirconia sheet partially stabilized with 2% by mole of yttria and containing 1% by mass of aluminium oxide was prepared in the same manner as in Example 14.

Reference Example 12

A zirconia powder partially stabilized with 6% by mole of yttria and containing 1% by mass of dispersed aluminium oxide was prepared in the same manner as in Example 14, except that a zirconia powder partially stabilized with 6% by mole of yttria (trade name: HSY-6.0, manufactured by Daiichi Kigenso Kagaku Kogyo Co., Ltd., Japan) were employed.

Using the above-prepared zirconia powder, an about 100 mm×100 mm×0.3 mm square zirconia sheet partially stabilized with 6% by mole of yttria and containing 1% by mass of aluminium oxide was prepared in the same manner as in Example 14.

Evaluation Test Example 4

The zirconia sheets obtained in Examples 12 to 16 and Reference Examples 7 to 12 were subjected to a test. Carbon was deposited to a thickness of 150 angstroms onto the surface of a sample sheet by ion sputtering vapor deposition, and an electron micrograph of the surface of a magnification of 15000 times was taken with a scanning electron microscope (trade name: Type S-570, manufactured by Hitachi, Ltd., Japan). The sizes of all the grains in the field of the photograph were measured with vainer calipers, and the average, maximum, and coefficient of variation of the grain sizes were determined based on the above data. In the determination of the grain sizes, a grain on the edge of the photographic field, the whole of which did not appear in the field, was withdrawn from the object to be measured. As for a grain having different sizes according to directions, the grain size was defined as the average of lengths of the larger diameter and smaller diameter.

Separately, 5 mm×50 mm test pieces were prepared from each sample zlrconia sheet to be tested, and the three-point bending strength of the test piece was measured (initial strength) at room temperature according to the method described in JIS R1601. Another ply of the test piece was held in an electric furnace at 950° C. for 1000 hours or more, and the three-point bending strength of this test piece was then measured at room temperature. The durability at high temperatures was calculated according to the following equation. The results are shown in Table 3.

Durability at high temperatures=(Strength after holding at 950° C. for a given time)/(Initial strength)

Likewise, 20 mm×5 mm test pieces were prepared from each sample zirconia sheet to be tested, and the proportions (M) of monoclinic fractions of the test pieces were determined. One of the test pieces was the one placed at room temperature, and the others were tested after holding in an electric furnace at 950° C. for 1000 hours respectively. Peak intensities of the monoclinic crystal (1,1,−1) plane observed in the vicinity of an interplanar spacing d=3.16, of the tetragonal crystal (1,1,1) plane observed in the vicinity of an interplanar spacing d=2.96, and the cubic crystal (1,1,1) plane observed in the vicinity of an interplanar spacing d=2.93 were determined with an X-ray diffractometer (trade name: RU-300, manufactured by Rigaku Denki Kogyo K.K., Japan) with an X-ray of CuKα1 (50 kV/300 mA), a wide-angle goniometer, and a curved crystal monochrometer at 2θ of 26° to 33°. The proportion (M) of the monoclinic fractions was calculated from the peak intensities according to the equation (1).

The contents of titanium oxide, silica, sodium oxide and other components were measured with an inductively coupled plasma (ICP) spectrometer (trade name: UOP-1 MK II, manufactured by Kyoto Koken Co., Ltd., Japan). The results are shown in Tables 3 and 4.

Evaluation Test Example 5

The burr heights and dimple heights of the zirconia sheets obtained in Examples 12 to 16 and Reference Examples 7 to 12 were determined in the same manner as in Evaluation Test Example 1. The results are set forth in Tables 3 and 4.

TABLE 3

| | Ex. 11 | Ex. 12 | Ex. 13 | Ex. 14 | Ex. 15 |
|---|---|---|---|---|---|
| Yttria content | 3Y | 3.2Y | 3.2Y | 3.5Y | 4.0Y |
| Dispersed reinforcing oxide | titanium oxide | titanium oxide | niobium oxide | aluminium oxide | titanium oxide/aluminium oxide |
| Content (mass %) | 0.3 | 0.8 | 0.5 | 1.0 | 0.6/0.6 |
| Sheet composition (mass %) | | | | | |
| Titanium oxide | 0.31 | 0.77 | 0.009 | 0.01 | 0.63 |
| Aluminium oxide | 0.02 | 0.01 | 0.02 | 0.98 | 0.62 |
| Niobium oxide | ≦0.001 | ≦0.001 | 0.53 | ≦0.001 | ≦0.001 |
| Silica | 0.003 | 0.003 | 0.004 | 0.008 | 0.008 |
| Sodium oxide | 0.001 | 0.002 | 0.002 | 0.005 | 0.005 |
| Grain size (μm) | | | | | |
| Average | 0.34 | 0.34 | 0.37 | 0.30 | 0.39 |
| Maximum | 0.52 | 0.55 | 0.63 | 0.51 | 0.80 |
| Coefficient of variation (%) | 28 | 26 | 25 | 23 | 28 |
| 3-point bending strength (N/mm²) | | | | | |
| Initial | 1100 | 1050 | 1060 | 910 | 820 |
| Weibull coefficient | 12.1 | 12.5 | 11.4 | 12.7 | 11.1 |
| High temperature durability (%) | | | | | |
| 1000 Hrs | 98 | 98 | 97 | 98 | 99 |
| 2000 Hrs | 97 | 98 | 95 | 97 | 96 |
| Monoclinic fraction (%) | | | | | |
| Initial | 0.1 | 0.1 | 0.3 | 0 | 0.2 |
| 1000 Hrs | 0.2 | 0.2 | 0.3 | 0.5 | 0.3 |
| 2000 Hrs | 0.5 | 0.6 | 0.3 | 0.8 | 0.4 |
| Slurry particle size distribution (μm) | | | | | |
| Average particle diameter | 0.48 | 0.40 | 0.40 | 0.24 | 0.36 |
| 90% by volume diameter | 1.25 | 1.17 | 1.19 | 0.88 | 1.03 |
| Critical particle diameter | 2.95 | 2.89 | 2.90 | 2.53 | 2.79 |
| Burr height (μm) | 22 | 27 | 17 | 4 | 8 |
| Dimple height (μm) | 25 | 15 | 15 | 30 | 25 |

TABLE 4

| | Ref.Ex. 7 | Ref.Ex. 8 | Ref.Ex. 9 | Ref.Ex. 10 | Ref.Ex. 11 | Ref.Ex. 12 |
|---|---|---|---|---|---|---|
| Yttria content | 3Y | 3Y | 3.2Y | 3.5Y | 2Y | 6Y |
| Dispersed reinforcing oxide | — | titanium oxide | titanium oxide | niobium oxide | aluminium oxide | aluminium oxide |
| Content (mass %) | 0 | 0.05 | 3 | 0.5 | 1.0 | 1.0 |
| Sheet composition (mass %) | | | | | | |
| Titanium oxide | 0.01 | 0.064 | 3.10 | 0.01 | 0.01 | 0.01 |
| Aluminium oxide | 0.02 | 0.02 | 0.02 | 0.1 | 1.04 | 1.03 |
| Niobium oxide | ≦0.001 | ≦0.001 | ≦0.001 | 0.51 | ≦0.001 | ≦0.001 |
| Silica | 0.003 | 0.003 | 0.004 | 0.35 | 0.008 | 0.008 |
| Sodium oxide | 0.001 | 0.001 | 0.002 | 0.20 | 0.005 | 0.005 |
| Grain size (μm) | | | | | | |
| Average | 0.33 | 0.33 | 0.41 | 0.59 | 0.38 | 0.74 |
| Maximum | 0.52 | 0.50 | 0.85 | 1.08 | 0.72 | 2.18 |
| Coefficient of variation (%) | 27 | 27 | 33 | 38 | 31 | 56 |
| 3-point bending strength (N/mm$^2$) | | | | | | |
| Initial | 1030 | 1030 | 880 | 1180 | 1160 | 590 |
| Weibull coefficient | 12.6 | 12.5 | 9.4 | 13.3 | 11.8 | 8.9 |
| High temperature durability (%) | | | | | | |
| 1000 Hrs | 93 | 94 | 97 | 88 | 79 | 93 |
| 2000 Hrs | 90 | 91 | 89 | 81 | 73 | 86 |
| Monoclinic fraction (%) | | | | | | |
| Initial | 0.1 | 0.1 | 0.1 | 0.2 | 0.7 | 0.3 |
| 1000 Hrs | 3 | 2 | 6 | 10 | 13 | 3 |
| 2000 Hrs | 6 | 5 | 10 | 12 | 18 | 5 |
| Slurry particle size distribution (μm) | | | | | | |
| Average particle diameter | 0.48 | 0.40 | 0.42 | 0.47 | 0.33 | 0.53 |
| 90% by volume diameter | 1.31 | 1.16 | 1.25 | 1.78 | 0.98 | 1.90 |
| Critical particle diameter | 2.88 | 2.87 | 3.08 | 4.25 | 2.57 | 3.30 |
| Burr height (μm) | 87 | 79 | 11 | 45 | 9 | 3 |
| Dimple height (μm) | 10 | 20 | 5 | 55 | 10 | 10 |

Other embodiments and variations will be obvious to those skilled in the art, and this invention is not to be limited to the specific matters stated above.

What is claimed is:

1. A ceramic sheet, (a) having a thickness of 50 μm or more, (b) having a burr height on the periphery of the sheet of ±100 μm or less, and/or having a dimple height on the surface of the sheet of 100 μm or less, (c) said burr height and said dimple height being determined by irradiating the sheet with a laser beam to measure reflected light, and three-dimensionally analyzing said reflected light with a laser optical three-dimensional profiling instrument.

2. A ceramic sheet according to claim 1, further having a waviness height on the surface of the sheet of 100 μm or less.

3. A ceramic sheet according to claim 1, comprising a zirconia ceramic.

4. A ceramic sheet according to claim 1, wherein said ceramic sheet comprises a zirconia ceramic, said zirconia ceramic being partially stabilized with 2.8 to 4.5% by mole of yttria and comprising 0.1 to 2% by mass of at least one dispersed rein forcing oxide, wherein the surface of the sheet has an average grain size of 0.1 to 0.4 μm, a maximum grain size of 0.4 to 0.8 μm, and a coefficient of variation of 30% or less, said grain size being determined by scanning electron microscopic observation of the surface of the sheet.

5. A ceramic sheet according to claim 4, wherein said dispersed reinforcing oxide comprises at least one selected from the group consisting of oxides of Group 4A elements, Group 5A elements, Group 3B elements, and Group 4B elements, and wherein said sheet has a content of silica of 0.1% by mass or less and a total content of alkali metal oxides of 0.1% by mass or less.

6. A ceramic sheet according to claim 1, which is a thin film sheet having a thickness of 50 to 500 μm.

7. A ceramic sheet according to claim 1, which is for use in a planar solid oxide fuel cell.

* * * * *